United States Patent
DeRosa et al.

(10) Patent No.: US 12,338,318 B2
(45) Date of Patent: Jun. 24, 2025

(54) POLYPROPIOLACTONES AND METHODS OF PREPARATION

(71) Applicant: Novomer, Inc., Rochester, NY (US)

(72) Inventors: Christopher A. DeRosa, Rochester, NY (US); Eric Stoutenburg, Rochester, NY (US); Lisa B. Todd, Rochester, NY (US); Catherine A. Falkner, Rochester, NY (US)

(73) Assignee: Novomer, Inc., Rochester, NY (US)

( * ) Notice: Subject to any disclaimer, the term of this patent is extended or adjusted under 35 U.S.C. 154(b) by 0 days.

(21) Appl. No.: 18/286,264

(22) PCT Filed: Apr. 12, 2022

(86) PCT No.: PCT/US2022/024398
§ 371 (c)(1),
(2) Date: Oct. 10, 2023

(87) PCT Pub. No.: WO2022/221266
PCT Pub. Date: Oct. 20, 2022

(65) Prior Publication Data
US 2024/0228695 A1    Jul. 11, 2024

Related U.S. Application Data

(60) Provisional application No. 63/175,667, filed on Apr. 16, 2021.

(51) Int. Cl.
*C08G 63/08*    (2006.01)

(52) U.S. Cl.
CPC .................... *C08G 63/08* (2013.01)

(58) Field of Classification Search
CPC ............ C08G 2230/00; C08G 2650/04; C08G 63/823; C08G 63/08
See application file for complete search history.

(56) References Cited

U.S. PATENT DOCUMENTS

| | | | |
|---|---|---|---|
| 5,310,948 A | 5/1994 | Prent et al. | |
| 5,359,081 A | 10/1994 | Drent et al. | |
| 5,552,515 A | 9/1996 | Hubbs et al. | |
| 10,662,283 B2 | 5/2020 | Farmer et al. | |
| 10,683,390 B2 | 6/2020 | Farmer et al. | |
| 11,814,478 B2 * | 11/2023 | Osaheni | C08G 63/912 |
| 2018/0030201 A1 | 2/2018 | Farmer et al. | |
| 2018/0155491 A1 | 6/2018 | Sookraj | |

FOREIGN PATENT DOCUMENTS

| | | |
|---|---|---|
| WO | 2003050154 A2 | 6/2003 |
| WO | 2004089923 A1 | 10/2004 |
| WO | 2005073317 A1 | 8/2005 |
| WO | 2010118128 A1 | 10/2010 |
| WO | 2012158573 A1 | 11/2012 |
| WO | 2013063191 A1 | 5/2013 |
| WO | 2014004858 A1 | 1/2014 |
| WO | 2014008232 A2 | 1/2014 |
| WO | WO-2019241596 A1 * 12/2019 ......... C08G 63/6852 |

OTHER PUBLICATIONS

Dunn (Synthesis of polyhydroxyalkanoates routes to poly (3-hydroxybutyrate and poly(3-hydroxypropionate) from the carbonylation and ring-opening polymerization of epoxides, Dissertation for the Degree of Doctor of Philosophy, Cornell University) , published on Aug. 2012.*
Furuhashi et al (Structural Characterization and Enzymatic Degradation of a-, b-, and g-Crystalline Forms for Poly(b-propiolactone), Macromol. Biosci. 2003, 3, 462-470, published on Sep. 2003).*
Getzler, Y. et al., "Synthesis of b-Lactones: A Highly Active and Selective Catalyst for Epoxide Carbonylation." vol. 124, No. 7, 2002, J. Am. Chem. Soc., pp. 1174-1175. Two pages.
"Synthesis of beta-Lactones" J. Am. Chem. Soc., vol. 124, 2002. Abstract, only.
International Preliminary Report on Patentability issued in co-pending International Application No. PCT/US2022/024398 mailed Jul. 12, 2023 (9 pages).
International Search Report and Written Opinion issued in co-pending International Application No. PCT/US2022/024398 mailed Mar. 10, 2023 (8 pages).
Reichardt, Christian "Solvents and Solvent Effects in Organic Chemistry", Third Edition, 2003 WILEY-VCH Verlag GmbH & Co. KGaA, Weinheim, Appendix A, Table A-1.

* cited by examiner

*Primary Examiner* — Gregory Listvoyb
(74) *Attorney, Agent, or Firm* — Young Basile Hanlon & MacFarlane, P.C.

(57) ABSTRACT

Disclosed are methods of efficiently making poly(3-hydroxypropionate) and related copolymers from beta propiolactone utilizing carboxylate salts of an onium cation. In another aspect, the present invention provides polymerization systems comprising combinations of initiators and monomers that together enable the efficient production of poly(3-hydroxypropionate) and related copolymers. Disclosed are novel polymer compositions having structures and/or compositional characteristics that differentiate them from previously produced polymers and polymer compositions.

10 Claims, 5 Drawing Sheets

POLYPROPIOLACTONES AND METHODS OF PREPARATION

CROSS REFERENCE FOR RELATED APPLICATIONS

This application is a National Stage 371 entry of PCT/US2022/024398 filed on Apr. 12, 2022, published as WO2022/221266, which claims priority from U.S. Provisional Application Ser. No. 63/175,667 filed Apr. 16, 2021, both of which are incorporated herein by reference in their entirety for all purposes.

TECHNICAL SUBJECT MATTER

This disclosure relates to polymer systems containing beta propiolactones and/or functionalized beta propiolactones and/or comonomers which polymerize with beta propiolactones and/or functionalized beta propiolactones and methods of preparing such systems. The polymer systems include crosslinked polymer systems and coatings and films prepared from such polymers.

BACKGROUND

Polyester polymers have proven to be versatile materials with a wide range of uses. Polyesters based on petroleum-derived aromatic monomers are among the most widely utilized polymers, for example polyethylene terephthalate (PET) is produced on massive scale for the production of water bottles, textiles and other consumer goods. PET is not biodegradable and has become a major contributor to the growing problem of environmental contamination by residual post-consumer plastic wastes, including damage to marine ecosystems. In recent years there has been increasing interest in biodegradable polyesters, examples include polylactic acid (PLA) and poly-3-hydroxyalkanoates (PHA). These polymers' high cost and properties have made it difficult to serve large volume applications to displace incumbent high-volume polymers. There remains a need for high performance biodegradable polyesters and methods of making such polymers from flexible feedstock sources that allow manufacturers to balance the cost and sustainability profiles of their products.

While the polymerization of beta propiolactone (BPL), also referred to as poly-3-hydroxyalkanoates (PHA), and related substituted beta lactones has been known for decades, it has not previously been possible to economically produce very high molecular weight poly-3-hydroxyalkanoates (PHA), such as poly(3-hydroxypropionate) (p3HP), or related copolymers, nor has it been straightforward to control the compositional properties and secondary structures of such polymers to optimize them for particular applications.

What are needed are polymers prepared from beta propiolactones and/or functionalized beta propiolactones having higher and controllable molecular weights. What are needed are polymers prepared from beta propiolactones and/or functionalized beta propiolactones having controllable polydispersity's. What are needed are methods of preparing such polymers which allow the preparation of polymer systems with the desired molecular weights and polydispersity's. What are needed are improved anionic initiator systems which provide for such control of the molecular weights and polydispersity's of the formed polymers.

SUMMARY

Disclosed are methods of efficiently making beta propiolactones and/or functionalized beta propiolactones (poly(3-hydroxyalkanoates) and related copolymers by utilizing selected polymerization initiators. The produced polymers may have unique properties which make them suitable for demanding commercial applications and which differentiate them from known polyesters made by other methods. Disclosed are polymerization systems comprising unique combinations of initiators, monomers, oligomers, end capping agents, chain extenders, chain transfer agents, solvents and crosslinking agents that enable the production of superior polymer products. Disclosed are polymer compositions having structures and/or compositional characteristics that differentiate them from previously produced polymers and polymer compositions Disclosed are polymers comprising one or more polymer chains having ring opened beta propiolactone and/or substituted betapropiolactone units and having on one end of the chains a residue of a carboxylate anion covalently bonded to the one end of the polymer chains. The one or more polymer chains may have the residue of an end capping agent or quenching agent on the other end of the chains. The end capping agents may comprise one or more electrophilic organic compounds. The end capping agents may comprise one or more one or more of an organohalide, organosulfonate, a haloalkyl silane, an aniline derivative, a phosphate derivative, boric derivatives, and an isophthalic acid derivative. The polymer may comprise chains according to

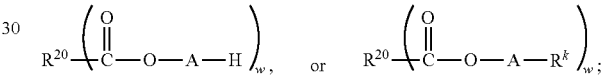

wherein: A is separately in each occurrence a polymer chain having ring opened beta propiolactone and/or substituted betapropiolactone units; $R^{20}$ is separately in each occurrence a hydrocarbyl group which is optionally substituted; and, $R^k$ is separately in each occurrence the residue of an endcapping agent or a quenching agent. A may be separately in each occurrence polymer chain comprising units derived from beta propiolactones and/or functionalized beta propiolactones, such as 3-hydroxypropionate and/or substituted 3-hydroxypropionate). w is separately in each occurrence a number of 1 or greater. $R^{20}$ may be separately in each occurrence an alkyl group. $R^k$ is separately in each occurrence the residue of an end capping agent wherein the end capping agent is an organohalide, organosulfonate, a haloalkyl silane, an aniline derivative, a phosphate derivative, a boric derivative, or an isophthalic acid derivative. Disclosed is a polymerizable composition comprising: a. one or more of beta propiolactone and/or substituted betapropio-lactones; and, b. one or more carboxylate salts of an onium cation. The polymerizable composition may contain one or more comonomers which copolymerize with one or more of beta propiolactone and/or substituted betapropiolactones. The polymerizable composition may contain one or more of chain transfer agents, chain extenders, end capping agents and quenching agents. The ratio of the one or more of beta propiolactone and/or substituted betapropiolactones to the one or more carboxylate salts of an onium cation may be from about 100 to 1 to about 1,000,000 to 1. The end-capping or quenching agent is present in an amount of less than 10 molar equivalents relative to the amount of carboxylate salt of an onium cation added. The polymerizable composition may comprise comonomers are one or more of caprolactones, lactides, epoxides, oxetanes, cyclic anhydrides, cyclic ethers, lactams, episulfides, aziridines, (meth)acrylates, valerolactones, butyrolactone, glycolides, and substituted glycolides. The polymerizable composition may comprise one or more of chain extenders, branching agents, and the like. The onium cations may contain one or more of nitrogen, phosphorus, sulfur, antimony or arsenic.

Disclosed is a method comprising contacting one or more of beta propiolactone and substituted betapropiolactones, and optionally one or more comonomers with one or more carboxylate salts of an onium cation under conditions to prepare one or more polymers comprising one or more polymer chains having ring opened beta propiolactone and/or substituted betapropiolactone units, and optionally comonomer units, and having on one end of the chains a residue of carboxylate salt of an onium cation covalently bonded to the one end of the polymer chains. The ratio of one or more of beta propiolactone and/or substituted betapropiolactones and optional comonomer to the one or more carboxylate salt of an onium cation is from about 100 to 1 to about 1000,000 to 1. The one or more of beta propiolactone and/or substituted betapropiolactones, and optional comonomers, and one or more carboxylate salts of an onium cation may be contacted at a temperature of from about 0° C. to about 120° C. The one or more of beta propiolactone and/or substituted betapropiolactones and comonomers and one or more carboxylate salts of an onium cation may be contacted at a pressure of between about 1 bar and about 20 bar. The one or more of beta propiolactone and/or substituted betapropiolactones and comonomers and one or more carboxylate salts of an onium cation may be contacted for a time sufficient to get to the desired molecular weight of the polymers prepared from one or more of beta propiolactone and/or substituted betapropiolactones, and optional comonomers. The quenching agent may be one or more of mineral acids, organic acids, acidic resins or solids, and an end capping agent. one or more carboxylate salts of an onium cation. The end capping agents may comprise one or more electrophilic organic compounds. The end capping agents may comprise one or more one or more of an organohalide, organosulfonate, a haloalkyl silane, an aniline derivative, a phosphate derivative, a boric acid, and an isophthalic acid derivative. The end-capping may be present in an amount of less than 10 molar equivalents relative to the amount of the carboxylate salt of an onium cation. The method may be performed in a non-polar solvent. The solvent may be a non-polar ether. The non-polar solvents may have a polarity of less than 0.2. The polarity may be based on the normalized $E_T^N$ as provided in Solvents and Solvent Effects in Organic Chemistry, Third Edition. Christian Reichardt, 2003 WILEY-VCH Verlag GmbH & Co. KGaA, Weinheim, Appendix A, Table A-1.

The polymers disclosed exhibit controllable molecular weights and controllable polydispersity's. The methods disclosed provide means of controlling the molecular weights and polydispersity's. The disclosed polymers may exhibit higher molecular weights than previous known for polymers comprising one or more polymer chains having ring opened beta propiolactone and/or substituted betapropiolactone units. Disclosed are polymer systems comprising one or more polymer chains having ring opened beta propiolactone and/or substituted betapropiolactone units which exhibit polymorphic characteristics.

DETAILED DESCRIPTION

Definitions

Figure 1:
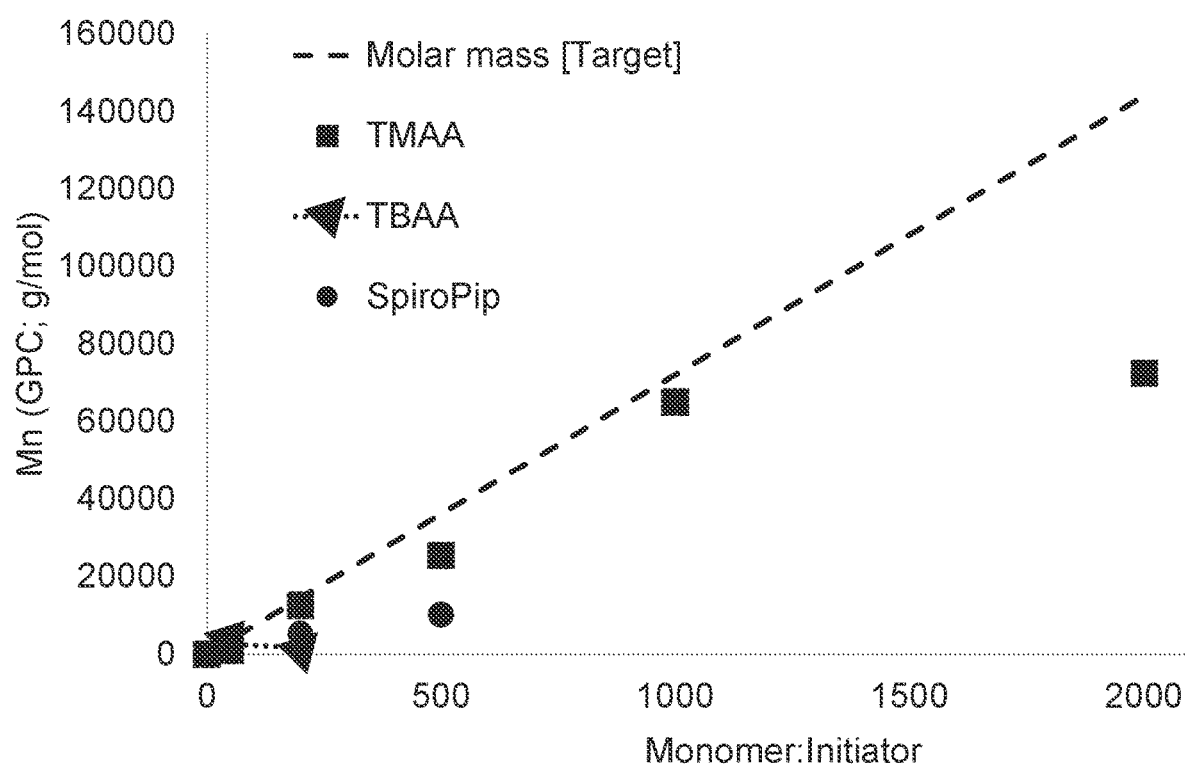
FIG. 1 illustrates the molar mass increases with monomer to initiator ratio.

Definitions of specific functional groups and chemical terms are described in more detail below. For purposes of this disclosure, the chemical elements are identified in accordance with the Periodic Table of the Elements, CAS version, Handbook of Chemistry and Physics, 75th Ed., inside cover, and specific functional groups are generally defined as described therein. Additionally, general principles of organic chemistry, as well as specific functional moieties and reactivity, are described in *Organic Chemistry*, Thomas Sorrell, University Science Books, Sausalito, 1999; Smith and March *March's Advanced Organic Chemistry*, 5th Edition, John Wiley & Sons, Inc., New York, 2001; Larock, *Comprehensive Organic Transformations*, VCH Publishers, Inc., New York, 1989; Carruthers, *Some Modern Methods of Organic Synthesis*, 3rd Edition, Cambridge University Press, Cambridge, 1987; the entire contents of each are incorporated herein by reference.

Certain polymers disclosed can comprise one or more asymmetric centers, and thus can exist in various stereoisomeric forms, e.g., enantiomers and/or diastereomers. The polymers and compositions thereof may be in the form of an individual enantiomer, diastereomer or geometric isomer, or may be in the form of a mixture of stereoisomers. The polymers disclosed may be enantiopure compounds. Disclosed are mixtures of enantiomers or diastereomers.

Certain polymers disclosed comprise monomers capable of enchainment by reaction at more than one site and may therefore create the possibility of regio-isomerism in the resulting polymer chains. Certain polymers disclosed can exist in different regio-isomeric forms. Certain polymers and compositions thereof described herein may be regioregular or may comprise degrees of regio-irregularity or even be substantially regio-random. The polymers disclosed may be substantially regioregular. Polymers disclosed may comprise one or more crystalline polymorphs, and thus can exist in various crystalline forms. Polymers and compositions thereof may be in the form of p crystalline polymorph, y crystalline polymorph, or 5 crystalline polymorph, or may be in the form of a mixture of crystalline polymorphs. Certain polymers, as described herein may have one or more double bonds that can exist as either the Z or E isomer, unless otherwise indicated. Disclosed are polymers as individual isomers substantially free of other isomers and alternatively, as mixtures of various isomers, e.g., racemic mixtures of enantiomers. The above-mentioned polymers per se, may encompass compositions comprising one or more polymers.

The term "beta lactone", as used herein, refers to a substituted or unsubstituted cyclic ester having a four-membered ring comprising an oxygen atom, a carbonyl group and two optionally substituted methylene groups. When unsubstituted, the beta lactone is referred to as propiolactone. Substituted beta lactones include monosubstituted, disubstituted, trisubstituted, and tetrasubstituted beta lactones. Such beta lactones may be further optionally substituted as defined herein. The beta lactones may comprise a single lactone moiety. The beta lactones may comprise two or more four-membered cyclic ester moieties.

The term "epoxide", as used herein, refers to a substituted or unsubstituted oxirane. Such substituted oxiranes include monosubstituted oxiranes, disubstituted oxiranes, trisubstituted oxiranes, and tetrasubstituted oxiranes. Such epoxides may be further optionally substituted as defined herein. The epoxides may comprise a single oxirane moiety. The epoxides comprise two or more oxirane moieties.

The term "polymer", as used herein, refers to a molecule of high relative molecular mass, the structure of which comprises the multiple repetition of units derived, actually or conceptually, from molecules of low relative molecular mass. The polymer may be comprised of beta lactone monomers (e.g., polypropiolactone). The polymers disclosed may be a copolymer, terpolymer, heteropolymer, block copolymer, or tapered heteropolymer incorporating two or more different monomers.

The terms "halo" and "halogen" as used herein refer to an atom selected from fluorine (fluoro, —F), chlorine (chloro, —Cl), bromine (bromo, —Br), and iodine (iodo, —I). The term "aliphatic" or "aliphatic group", as used herein, denotes a hydrocarbon moiety that may be straight-chain (i.e., unbranched), branched, or cyclic (including fused, bridging, and spiro-fused polycyclic) and may be completely saturated or may contain one or more units of unsaturation, but which is not aromatic. Aliphatic groups may contain 1-40 carbon atoms, 1-20 carbon atoms, 2-20 carbon atoms, 1-12 carbon atoms, 1-8 carbon atoms, 1-6 carbon atoms, 1-5 carbon atoms, 1-4 carbon atoms, 1-3 carbon atoms, or 1 or 2 carbon atoms. Aliphatic groups include, but are not limited to, linear or branched, alkyl, alkenyl, and alkynyl groups, and hybrids thereof such as (cycloalkyl) alkyl, (cycloalkenyl)alkyl or (cycloalkyl)alkenyl. The term "heteroaliphatic," as used herein, refers to aliphatic groups wherein one or more carbon atoms are independently replaced by one or more atoms selected from the group consisting of oxygen, sulfur, nitrogen, or phosphorus. Heteroaliphatic groups may be substituted or unsubstituted, branched or unbranched, cyclic or acyclic, and include saturated, unsaturated, or partially unsaturated groups.

The term "unsaturated", as used herein, means that a moiety has one or more double or triple bonds. The terms "cycloaliphatic", "carbocycle", or "carbocyclic", used alone or as part of a larger moiety, refer to a saturated or partially unsaturated cyclic aliphatic monocyclic or polycyclic ring system, as described herein, having from 3 to 12 members, wherein the aliphatic ring system is optionally substituted as defined below and described herein. Cycloaliphatic groups include, without limitation, cyclopropyl, cyclobutyl, cyclopentyl, cyclopentenyl, cyclohexyl, cyclohexenyl, cycloheptyl, cycloheptenyl, cyclooctyl, cyclooctenyl, norbornyl, adamantyl, and cyclooctadienyl. A cycloaliphatic group may have 3-6 carbons. The terms "cycloaliphatic", "carbocycle" or "carbocyclic" also include aliphatic rings that are fused to one or more aromatic or nonaromatic rings, such as decahydronaphthyl or tetrahydronaphthyl, where the radical or point of attachment is on the aliphatic ring. The term "alkenyl," as used herein, denotes a monovalent group derived from a straight- or branched-chain aliphatic moiety having at least one carbon-carbon double bond by the removal of a single hydrogen atom. The term "alkynyl," as used herein, refers to a monovalent group derived from a straight- or branched-chain aliphatic moiety having at least one carbon-carbon triple bond by the removal of a single hydrogen atom. "Alkoxylated" means that one or more functional groups on a molecule has appended to it a hydroxy-terminated alkyl chain. Alkoxylated compounds may comprise a single alkyl group or they may be oligomeric moieties such as hydroxyl-terminated polyethers. Alkoxylated materials can be derived from the parent compounds by treatment of the functional groups with epoxides. The term "alkoxy", as used herein refers to an alkyl group, as previously defined, attached to the parent molecule through an oxygen atom. Examples of alkoxy, include but are not limited to, methoxy, ethoxy, propoxy, isopropoxy, n-butoxy, tert-butoxy, neopentoxy, and n-hexoxy. The term "acyl", as used herein, refers to a carbonyl-containing functionality, e.g., —C(=O)R', wherein R' is hydrogen or an optionally substituted aliphatic, heteroaliphatic, heterocyclic, aryl, heteroaryl group, or is a substituted (e.g., with hydrogen or aliphatic, heteroaliphatic, aryl, or heteroaryl moieties) oxygen or nitrogen containing functionality (e.g., forming a carboxylic acid, ester, or amide functionality). The term "acyloxy", as used here, refers to an acyl group attached to the parent molecule through an oxygen atom. The term "aryl" used alone or as part of a larger moiety as in "aralkyl", "aralkoxy", or "aryloxyalkyl", refers to monocyclic and polycyclic ring systems having a total of five to 20 ring members, wherein at least one ring in the system is aromatic and wherein each ring in the system contains three to twelve ring members. The term "aryl" may be used interchangeably with the term "aryl ring" wherein "aryl" refers to an aromatic ring system which includes, but is not limited to, phenyl, biphenyl, naphthyl, anthracyl and the like, which may bear one or more substituents. Also included within the scope of the term "aryl", as it is used herein, is a group in which an aromatic ring is fused to one or more additional rings, such as benzofuranyl, indanyl, phthalimidyl, naphthimidyl, phenantriidinyl, or tetrahydronaphthyl, and the like, where the radical or point of attachment is on the aryl ring.

The terms "heteroaryl" and "heteroar-", used alone or as part of a larger moiety, e.g., "heteroaralkyl", or "heteroaralkoxy", refer to groups having 5 to 14 ring atoms, including 5, 6, or 9 ring atoms; having 6, 10, or 14 π electrons shared in a cyclic array; and having from one to five heteroatoms. The term "heteroaryl" may be used interchangeably with the terms "heteroaryl ring" and "heteroaryl group", any of which terms include rings that are optionally substituted. The term "heteroatom" refers to nitrogen, oxygen, or sulfur, and includes any oxidized form of nitrogen or sulfur, and any quaternized form of a basic nitrogen. A heteroaryl group may be mono- or bicyclic. The term "heteroaralkyl" refers to an alkyl group substituted by a heteroaryl, wherein the alkyl and heteroaryl portions independently are optionally substituted. The term "partially unsaturated" refers to a ring moiety that includes at least one double or triple bond.

The compounds disclosed may contain "optionally substituted" moieties. The term "substituted", means that one or more hydrogens of the designated moiety are replaced with a substituent. An "optionally substituted" group may have a substituent at each substitutable position of the group, and when more than one position in any given structure may be substituted with more than one substituent selected from a specified group, the substituent may be either the same or different at every position. Combinations of substituents envisioned are those that result in the formation of stable or chemically feasible compounds. The term "stable" refers to compounds that are not substantially altered when subjected to conditions to allow for their production, detection, their recovery, purification, and use for one or more purposes disclosed herein. Unless otherwise specified, "a," "an," "the," and "at least one" are used interchangeably and mean one or more than one.

Methods

Disclosed are methods of polymerizing beta propiolactone (BPL) and/or substituted beta propiolactone, optionally in combination with one or more additional co-monomers (collectively monomers), using an initiator derived from one or more carboxylate salts of an onium cation. The initiator may, or may not be, covalently attached in the final polymer product.

Feed Ratios and Polymer Characteristics

The method comprises the step of contacting the monomers with one or more carboxylate salts of an onium cation initiator wherein a molar ratio of monomers to initiator is selected so as to prepare a polymer of the desired molecular weight. The mole ratio of monomers to initiator may be 10:1 or greater, 100:1 or greater, 1,000:1 or greater, 2,000:1 or greater, 3,000:1 or greater, 4,000:1 or greater, 5,000:1 or greater, 7,500:1 or greater, 10,000:1 or greater, 15,000:1 or greater, 20,000:1 or greater, 30,000:1 or greater, 40,000:1 or greater, 50,000:1 or greater, 75,000:1 or greater, or 100,000:1 or greater. The initiator is contacted with the monomers for sufficient time to prepare polymers of the desired molecular weight. The method may comprise the step of allowing the initiator to contact the monomers until a polymer composition having a number average molecular weight Mn of 50,000 g/mol or greater, 75,000 g/mol or greater, 100,000 g/mol or greater, 150,000 g/mol or greater, 200,000 g/mol or greater, 250,000 g/mol or greater, 300,000 g/mol or greater, 400,000 g/mol or greater, 500,000 g/mol or greater, 600,000 g/mol or greater or 700,000 g/mol or greater, is formed. Mn of the polymer composition refers to that measured by gel permeation chromatography (GPC) using THF as the solvent and referenced to monodisperse polymethyl methacrylate standards.

A GPC chromatogram of the produced polymer composition may be multimodal and include one or more peaks representing a distinct population of low molecular weight oligomers (e.g. polyester chains) having a molecular weight of about 5,000 g/mol or less, about 4,500 or less, about 4,000 or less, about 3,500 or less, about 3,000 or less, about 2,500 or less, about 2,000 less, about 1,500 or less or about 1,000 g/mol or less. The GPC chromatogram of the produced polymer composition, the ratio of the area of peaks resulting from polymer chains having an Mn above 50,000 g/mol to the area of peaks representing oligomers with Mn below 5,000 g/mol may be at least 10:1.

The method includes allowing the initiator to contact the monomers for a prescribed interval of time. The method may include the step of monitoring the progress of the polymerization reaction (for example by analyzing aliquots from the reaction mixture by a suitable technique such as GPC, or by utilizing in situ monitoring techniques). The method may include the step of monitoring the increase in the molecular weight of the polymer and/or monitoring a decrease in monomer concentration. The method may include stopping the reaction when the molecular weight of the polymer (or a proxy for molecular weight such as reaction viscosity) reaches a desired value or exceeds a predetermined threshold. The method may include the step of monitoring the depletion of monomers until their concentration reaches a desired concentration or falls below a predetermined threshold. The method may include the step of stopping the reaction when the concentration of monomers reaches a desired concentration or falls below a predetermined threshold.

The polymer composition formed may have a low polydispersity, for instance a polydispersity index (PDI) of 3.5 or less, 3.0 or, 2.5 or less, 2.2 or less, 2.0 or less, 1.8 or less, 1.7 or less, 1.6 or less, 1.5 or less, 1.4 or less, 1.3 or less, 1.2 or less, 1.1 or less, 1.05 or less. The polymer composition formed may have a PDI of 1.05 or greater, 1.1 or greater, 1.2 or greater, 1.5 or greater or 2.0 or greater. The PDI values recited refer to that measured by GPC. The PDI values may be calculated without inclusion of GPC peaks arising from oligomers having Mn below about 5,000 g/mol, less than about 4,500, less than about 4,000, less than about 3,500, less than about 3,000, less than about 2,500, less than about 2,000, less than about 1,500 or less than about 1,000 g/mol.

The polymers prepared may have number average molecular weights of greater than about 17,000 g/mol, 20,000 g/mol, 25,000 g/mol, 50,000 g/mol, 100,000 g/mol, 200,000 g/mol, 300,000 g/mol or 500,000 g/mol as measured as disclosed herein. The polymers prepared may have number average molecular weights of less than 1,000,000. The polymers prepared may have weight average molecular weights of greater than about 17,000 g/mol, 20,000 g/mol, 25,000 g/mol, 50,000 g/mol, 100,000 g/mol, 200,000 g/mol, 300,000 g/mol, 500,000 g/mol, 600,000 g/mol or 700,000 g/mol as measured as disclosed herein. The polymers prepared may have number average molecular weights of less than 2,000,000. The polymers prepared may exhibit a weight average molecular weight of 25,000 g/mol or greater and a polydispersity calculated from gel permeation chromatography data of 3.0 or less, 50,000 g/mol or greater and a polydispersity of 2.5 or less, 100,000 g/mol or greater and a polydispersity of 3.0 or less or 200,000 g/mol or greater and a polydispersity calculated from gel permeation chromatography data of 2.5 or less.

The polymers may be polymorphic. The polymorphic polymers may have DSC peaks at from 73 to 83° C. and from 110 to 125° C. The polymorphic polymers may have DSC peaks at from 73 to 83° C., from 89 to 95° C. and from 110 to 125°.

Reaction Conditions

The monomers may be contacted with the initiator in a solvent. the solvent may comprise one or more polar non-protic solvents, such as amides, nitriles, and sulfoxides, protic liquids such as water or alcohols, an ether, ester, ketone or an aliphatic or aromatic hydrocarbon or a halogenated hydrocarbon. The solvent may comprise a fluorinated hydrocarbon. The solvent may comprise a $C_{4-12}$ aliphatic hydrocarbon, an ether or a chlorinated hydrocarbon. The solvent may comprise an ether, petroleum ether, isobutane, pentanes, hexanes, or heptanes, or higher aliphatic hydrocarbons. The solvent may comprise isobutane or hexane. The solvent may be substantially anhydrous. The solvent may comprise an ether selected from tetrahydrofuran, 1,4 dioxane, 1,3-dioxane, dimethoxyethane, diglyme, triglyme, tetraglyme, 1,3 dioxolane, t-butylmethyl ether, and diethyl ether. The solvent may comprise tetrahydrofuran which may be anhydrous.

The solvent may be a nonpolar solvent. The solvent may be a nonpolar ether. The solvent may be a non-cyclic ether. The solvent may have a polarity of less than 0.2 as disclosed hereinbefore. The solvent may be a dialkyl ether or an alkyl cycloalkyl ether. The alkyl groups may be branched or straight chains. The alkyl groups may not contain unsaturated groups. Exemplary non-polar solvents include methyl tert-butyl ether, dimethyl ether, diethyl ether, cyclopentyl methyl ether, ethyl acetate and diisopropyl ether.

The initiator may have low solubility in some solvents and the resulting polymer may exhibit higher molecular weights that expected because the effective ratio of monomer in the reactive system may be higher due to a portion of the initiator charged not being soluble in the reaction solvent.

The methods may comprise contacting monomers with the initiator without a solvent. The polymerization may be conducted in neat monomers. The method may comprise contacting monomers in a solvent system in which the initiator is not soluble. The method may comprise contacting the comonomers with a suspension of solid particles comprising the initiator. The method may comprise contacting neat monomer(s), with solid particles comprising the initiator wherein the solid particles are insoluble in the neat monomer(s).

The initiator and the monomers may be contacted at low, ambient or elevated temperatures. The mixture may be maintained at a temperature of about 30° C. or greater, about 40° C. or greater, about 50° C. or greater, about 60° C. or greater, about 70° C. or greater, about 80° C. or greater or about 100° C. or greater. The mixture may be maintained at a temperature of about 120° C. or less or about 100° C. or less. The mixture may be maintained at a temperature about 20° C. or less, about 15° C. or less, about 10° C. or less, about 5° C. or less, about 0° C. or less, about −10° C. or less, to about −20° C. The method may include the step of removing heat from the mixture to maintain the desired temperature. The method may include changing the temperature of the polymerization mixture over time during the process. The method may include the step of cooling the mixture to maintain the desired temperature. The method may include changing the temperature of the polymerization mixture over time during the process.

The polymerization may be conducted at elevated pressure. This allows processes to be conducted at temperatures above the boiling point of certain reaction mixture components (e.g. solvents, monomers) and/or may aid in separation of volatile components when the pressurized process stream or reaction vessel is depressurized. The monomers may be contacted with the initiator at a pressure above 1 bar, about 2 bar or greater, about 3 bar or greater, about 5 bar or greater, about 10 bar or greater, about 15 bar or greater, about 20 bar or greater, about 30 bar or greater or about 40 bar or greater. The pressure may be about 50 bar or less, about 60 bar or less, about 70 bar or less, about 80 bar or less, about 90 bar or less or about 100 bar or less. The pressure may be applied by pressurizing a reactor headspace in contact with the reaction mixture e.g. by introducing a pressurized inert gas. The pressure may be applied by heating the mixture in a contained volume. The pressure may be maintained by applying pressure to a hydrostatically filled reaction vessel. Two or more of these approaches may be used. The pressure may be controlled by application of a back-pressure regulator or other pressure relief system.

The methods provided herein can be performed in a batch process, continuous process or a hybrid of batch and continuous processes (e.g. fed batch reactions). The method may comprise the step of feeding one or more components to the polymerization mixture over time. Monomers, oligomers, end capping agents, chain extenders, chain transfer agents, or crosslinking agents may be added to the polymerization mixture over time (either continuously, or in one or more discrete additions). The composition of monomers added may be changed over time. Such methods may be characterized in that the polymer composition produced comprises a tapered copolymer or block copolymer.

The method may comprise fed-batch processes and include a step of dissolving or suspending the initiator in a reaction vessel (optionally with a solvent and/or an initial charge of monomers) and then feeding monomers, chain extenders, chain transfer agents, or crosslinking agents into the initiator mixture at a controlled rate. Such methods can be beneficial for controlling the exotherm associated with ring opening polymerization of some of the monomers and maintaining safe operating conditions. Certain monomers may be fed at a rate determined, at least in part, by the rate of exotherm observed in the reaction mixture. The monomers may be fed to the process continuously. The monomers may be fed to the process discontinuously (e.g. in discrete additions or at varying rates). The monomers may be fed for a period of time and then ceased at some interval prior to the end of the polymerization.

The methods may comprise continuous flow processes and include a step of continuously adding the initiator to a reaction stream of monomer(s). The combined initiator and monomers stream may then be directed through a continuous reactor with sufficient contact time and temperature profile to produce the desired degree of polymerization. The method may include the addition of more initiator, additional monomers, solvents or other reaction components at locations along the length of the continuous reactor.

The methods may comprise continuous flow processes and include a step of contacting a reaction stream comprising the initiator and monomer(s) in an extruder. The combined initiator monomer(s) stream may be directed through an extruder with sufficient contact time and temperature profile to consume substantially all of the monomer(s). The method may include a reactive extruder with a temperature gradient between the inlet and outlet. The temperature toward the outlet of the extruder may be higher than the temperature of the extruder inlet. In such process no solvent may be present in the reaction stream and the outlet from the extruder comprises molten polymer. The molten polymer stream from the extruder may be fed to a pelletizer to produce pellets of solid polymer. The method may include a reactive extruder coupled to a pre-reactor that feeds an inlet to the extruder. The pre-reactor may comprise a plug flow reactor, a batch or fed batch reactor. Two more pre-reactors may feed a single extruder. A single pre-reactor may feed two or more reactive extruders.

The methods may comprise continuous flow processes and include a step of contacting a reaction stream comprising the initiator and monomer(s) in one or more reactors. The method may include a slurry batch reactor, a slurry continuous stirred tank reactor or a slurry loop reactor. The monomers may be polymerized in a liquid-phase polymerization reactor and/or gas-phase polymerization reactor. As polymer chains develop during polymerization in the reactor, solid particles of solid polymer may be produced in the reactor and the process stream may thereby constitute a slurry. The polymer particles in the slurry may possess one or more melt, physical, rheological, and/or mechanical properties of interest, such as density, melt index (MI), melt flow rate (MFR), comonomer content, molecular weight and crystallinity. Different properties for the particles may be desirable depending on the application to which the polymer is to be applied. Selection and control of the reaction conditions within the reactor, such as temperature, pressure, chemical concentrations, polymer production rate and initiator type may affect the polymer particle properties.

Quenching

The disclosed methods may comprise a step of quenching the polymerization reaction. A quenching agent may be added after a specified reaction time, or when the polymer composition has reached a desired molecular weight (e.g. when the Mn of the formed polymer composition exceeds a predetermined threshold). The quenching agent may be added when substantially all of the monomer(s) have been consumed. Where the method comprises a continuous process utilizing a plug-flow reactor, a quenching agent is added at a particular point along the length of the reactor. The quench agent may be one or more of mineral acids, organic acids, and acidic resins or solids. The quenching agent may be HCl, $H_2SO_4$, $R_qSO_3H$, HBr, $H_3PO_4$, an acidic resin, or an acidic inorganic solid. The quenching agent may be a sulfonic acid derivative, boric acid or a boric acid derivative, phosphoric acid or a phosphoric acid derivative. The quenching agent may be a sulfonic acid. the sulfonic acid has the formula $R_qSO_3H$, wherein $R_q$ is a radical of optionally substituted aliphatic, optionally substituted aryl, optionally substituted heterocyclic or optionally substituted heteroaryl. $R_q$ may be a radical selected from optionally substituted $C_1$ to $C_{20}$ alkyl, $C_1$ to $C_{20}$ alkenyl and an optionally substituted phenyl. The sulfonic acid may be one or more of p-toluene sulfonic acid (also known as pTSA or tosylic acid), methane sulfonic acid, ethane sulfonic acid, 1-propane sulfonic acid, trifluoromethyl sulfonic acid, 4-nitrophenyl sulfonic acid, sulfoacetic acid, cumenesulphonic acid, xylene sulfonic acid, 3-amino-1-propanesulfonic acid, 2-sulfanyl ethanesulfonic acid, 3-hydroxy-1-propanesulfonic acid, benzenesulfonic acid, 4-hydroxybenzene sulfonic acid, cyclohexane sulfonic acid, 4-ethylbenzenesulfonic acid, 2,5-dimethylbenzene sulfonic acid, 4-methylmetanilic acid, 1-Naphthalenesulfonic acid or perfluorooctane sulfonic acid. The quenching agent may be methane sulfonic acid, p-toluene sulfonic acid or sulfamic acid. Acids used as quenching agents may act by protonating the active chain end(s) of the polymer (e.g. to form an —OH or $CO_2H$ group) with the anion of the acid acting as a counterion to the polymer bound cation from the initiator.

The quenching agent may be a phosphoric acid derivative having at least one acidic hydrogen atom. The phosphoric acid derivative may be one or more of phosphoric acid, pyrophosphoric acid, triphosphoric acid, an alkyl or aryl derivative of phosphoric acid, an alkyl or aryl derivative of pyrophosphoric acid, or an alkyl derivative or aryl of triphosphoric acid, The Quenching agent may be phosphoric acid having the formula:

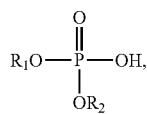

wherein, $R^1$ and $R^2$ are radicals independently selected from hydrogen, a monophosphate group, a diphosphate group, an optionally substituted alkyl, an optionally substituted aryl, an optionally substituted heterocyclic, an ester derivative of a monophosphate group, and an ester derivative of a diphosphate group. The quenching agent may be phosphorous acid, a phosphonic acid or phosphinic derivative having at least one acidic hydrogen atom. The quenching agent may be a phosphonic acid or phosphinic acid having the formula:

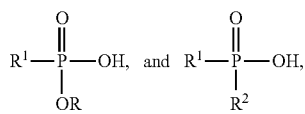

where each of R, $R^1$, and $R^2$ is as defined below.

The quenching agent may be a boron containing compound. The quenching agent may be fluoroboric acid.

The quenching agent may be an acid associated with a solid support. The solid supported acid may comprise an inorganic solid selected from silica, alumina, zirconia, titania, zeolites, metal oxides, and clays. The quenched composition may form a polymer composite with the inorganic solid quench agent. The method may comprise adding a polymer supported acid as a quenching agent. The polymeric support may comprise a polymer derived from at least one of styrene, chloromethylated styrene and divinylbenzene monomers. The polymeric solid support may be one or more of polystyrenes, polysulfones, nylons, poly(chloromethylstyrene); polyolefins, polyacrylic acid, polymethylmethacrylate and cross-linked ethoxylate acrylate resins. Where the quenching agent comprises a solid, the method may comprise flowing a reaction stream comprising the unquenched polymer through a fixed bed of solid quench agent. Where the method comprises a continuous process utilizing a plug-flow reactor, a quenching agent may be added at a particular point along the length of the reactor.

End-Capping

The methods comprise adding an end capping agent to quench the polymerization, as disclosed in PCT application WO2019241596A1, the entirety of which is incorporated herein by reference. The monomers may be polymerized such that the terminal end of the formed polymer chains have carboxylic or carboxylate functional groups. The terminal end groups are reacted with the end capping agent. The endcapping agent may render the formed polymers more stable. The end capping agents may comprise electrophilic organic compounds. The end capping agents may comprise one or more of an organohalide, organosulfonate, a haloalkyl silane, an aniline derivative, a phosphate derivative, a boric derivative, as disclosed herein, and an isophthalic acid derivative. The electrophilic reagents cap the growing chain ends and release an anion that satisfies the charge of the covalently bound Z+ group. A compound R—X' can react with an anionic chain end (e.g. to form an —OR or $CO_2R$ group) while the liberated anion X'— acts a counterion to the polymer bound cation.

The end capping agent may comprise an alkyl halide, such as an aliphatic chloride, bromide, or iodide. The endcapping agent may comprise a compound of formula $R_n$—$X_h$, where $R_n$ is an optionally substituted $C_{1-40}$ aliphatic group and $X_h$ is selected from Cl, Br or I. The end capping agent may comprise $R_p$—$CH_2$—$X_h$, where $R_p$ is —H or an optionally substituted radical selected from the group consisting of aliphatic, aryl, heterocyclic, and heteroaryl. The end capping agent may be one or more of methyl bromide, methyl iodide, allyl chloride, allyl bromide, benzyl chloride and benzyl bromide.

The end capping agent may comprise an organosulfonate. The organosulfonate may correspond to the formula $R_nOSO_2R_q$, where each of $R_q$ and $R_n$ is as defined above. The quenching agent may comprise methyl triflate. The end capping agent may comprise an organosulfate. The organosulfate may correspond to the formula $R_nOSO_2OR_n$, where $R_n$ is as defined above. The quenching agent may comprise a dialkylsulfate, such as dimethylsulfate or diethylsulfate.

The end capping agent may be a silane which may comprises a compound that contains a silyl or siloxy group. Such endcapping agents may correspond to one of the formulas:

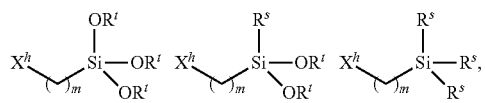

where $X^h$ is as defined above, each $R^t$ is methyl, ethyl or propyl, and each $R^s$ is —H, chloro, methyl, or ethyl. $X^h$ may be —Cl. $R^t$ may be methyl or ethyl. $R^s$ may be methyl. The end capping agent may comprise b-chloropropyltrimethoxysilane.

Thermally stable aniline derivatives may include azoles such as benzothiazole, benzoxazole, benzimidazole, 2-aminothiophenol, o-phenylenediamine, and 2-aminophenol. Exemplary end-capping agents may further include phosphates such as trimethylphosphate and triphenylphosphate. Exemplary end-capping agents may even further include other additives and stabilizers such as isophthalic acid.

The methods may comprise a step of adding a chain extender or cross-linking agent to the polymerization reaction. The chain extender or cross-linking agent may be added as a quenching agent. Analogs of the end capping agents described above having two or more suitable reactive functional groups in a single molecule may be utilized as quenching agents, they may act as chain extenders or cross-linking agents respectively. Quenching with a difunctional chain extender results in reaction with the carboxylate ends of two separate polymer chains leading to the formation of a dimeric chain extended product. Difunctional analogs of any of the quenching agents described above can be utilized to similar effect.

Chain extenders suitable for methods disclosed comprise compounds of formula X'-L'-X' where each X' is independently as defined above and L' comprises a bivalent moiety. L'- is an optionally substituted $C_1$-$C_{40}$ aliphatic group; an optionally substituted $C_1$-$C_{24}$ aliphatic group, an optionally substituted $C_1$-$C_{20}$ aliphatic group an optionally substituted $C_1$-$C_{12}$ aliphatic group, an optionally substituted $C_2$-$C_{10}$ aliphatic group; an optionally substituted $C_4$-$C_8$ aliphatic group, an optionally substituted $C_4$-$C_6$ aliphatic group, an optionally substituted $C_2$-$C_4$ aliphatic group, an optionally substituted $C_1$-$C_3$ aliphatic group, an optionally substituted $C_6$-$C_{12}$ aliphatic group, or an optionally substituted $C_1$, $C_2$, $C_3$, $C_4$, $C_5$, $C_6$, $C_7$ or $C_8$ aliphatic group.

L'- may be an optionally substituted straight alkyl chain or optionally substituted branched alkyl chain. -L'- may be a $C_{1-20}$ alkyl group having one or more methylene groups replaced by —C($R^aR^b$)— where $R^a$ and $R^b$ are each independently $C_{1-4}$ alkyl groups. L'- may be an aliphatic group having 2 to 30 carbons including one or more gem-dimethyl substituted carbon atoms. L'- may include one or more optionally substituted rings such as saturated or partially unsaturated carbocyclic, saturated or partially unsaturated heterocyclic, aryl, and heteroaryl. L'- may be a substituted ring (i.e. the X' groups are directly linked to atoms composing the ring in -L'-). The ring may be part of an -L'- moiety having one or more non-ring heteroatoms or optionally substituted aliphatic groups separating one or more of the X' group(s) from the ring. L'- may contain one or more heteroatoms in its main chain (i.e. in the group of covalently linked atoms separating the site(s) of attachment of the —X' groups). L'- may comprise a moiety corresponding to the structure resulting from replacing one or more $sp^2$ carbon atoms of an optionally substituted $C_{4-40}$ aliphatic moiety with a group selected from: —O—, —$NR^1$—, —S—, —S(O)—, —S(O)$_2$—, —OC(O)—, —OC(O)O—, —$NR^1$C(O)—, —$NR^1$C(O)O—, —$NR^1$C(O)$NR^1$—, —N═N—, —$NR^1$C(N)$NR^1$—, —SC(O)—, —SC(O)S—, —SC(S)S—, —$NR^1$C(O)S—, and —$NR^1$C(S)O—, where $R^1$ is as defined above and with the proviso that the -L'- moiety resulting from such replacements have a structure consistent with the recognized principles defining the structures of stable organic molecules. Where more than one such substitution is present, they may be separated by at least one aliphatic carbon atom or at least two aliphatic carbon atoms. L'- may comprise one or more ether linkages, one or more ester linkages, one or more urethane linkages and/or one or more amide linkages. L'- may comprise an oligomer or a polymer. The polymer may be one or more of polyolefins, polyethers, polyesters, polycarbonates, polyamides, and polyimides. Where -L'-comprises a polymer, the X' groups may be present on the ends of the polymer chains.

If a tri-functional or higher-functional end-capping agent is utilized, a star or comb polymer composition may be obtained. Such end-capping agents may have a formula L"-(X')$_{a'}$ where X' is as defined above and herein and L" is a multivalent linker having any of the formulae enumerated for L' but having three or more sites available for the covalent attachment of X' functional groups. L" may have 3 to about 50 or more X' groups attached. L" may have 3 or 4 to 6 attached X' groups. L" may comprise a polymer that has a large number (i.e. dozens or hundreds) of attached X' groups (as for example if the X' groups are present as substituents on monomers comprising a polymer L"). a' may be 3 or more, 3 to 50, 3 to 6 or 4 to 6.

The quenching, endcapping, crosslinking agent or chain extending agent may be added to the reaction mixture in an amount of less than 10 molar equivalents relative to the amount of initiator added to the polymerization process, for example from 0.1 to 10 molar equivalents relative to the amount of the initiator, from 0.1 to 2 molar equivalents, from 1 to 2 molar equivalents or about 1 molar equivalent.

Beta Propiolactones and/or Functionalized Beta Propiolactones

Disclosed are several novel polymer systems containing beta propiolactones and/or beta functionalized propiolactones. The beta propiolactones and/or functionalized beta propiolactones can be used as tie layers between polymeric layers wherein the polymeric layers can be based on the same polymers or based on different polymers. The different polymers may be incompatible with one another. The functionalized beta propiolactones and/or beta propiolactones may be used as adhesive layers to bind polymeric structures together or to other substrates. Polymers and copolymers of beta propiolactones and/or functionalized beta propiolactones may be used as coatings or free-standing films or in multilayer coatings or films. The functional groups may react with other monomer systems to form crosslinks between polymer layers or can polymerize into formed layers of other copolymers. The beta propiolactones and/or functionalized beta propiolactones may have functional groups that improve bonding of films or coatings to substrates.

The functional groups of the functionalized beta propiolactones may provide functionality to polymers and copolymers prepared from the functionalized beta propiolactones. The functional groups may function as polymerization initiators, improve adhesion of the polymers to certain substrates or polymer systems, improve the hydrophobic or hydrophilic properties, improve the hardness or scratch resistance, polymerization catalysts, and the like. Polymers and copolymers of functionalized beta propiolactones and/or beta propiolactones may function as intermediate layers in multilayer films, including such films having layers of different polymers. The polymers and copolymers of functionalized beta propiolactones and/or beta propiolactones decompose under certain circumstances and allow the other layers to be easily separated for reuse on recycling. Polymers and copolymers of functionalized beta propiolactones and/or beta propiolactones may function as an intermediate layer between coatings of other polymers and a substrate. The polymers and copolymers of functionalized beta propiolactones and/or beta propiolactones decompose under certain circumstances and allow the substrate to be easily separated from the other coating layers for reuse on recycling. The polymers and copolymers of functionalized beta propiolactones and/or beta propiolactones can be used as the outside film layer or coating layer that can be decomposed or such outside layer can be functionalized to provide a desired set of properties to the structure.

Disclosed are beta-propiolactone and functionalized beta-propiolactone having the general formula:

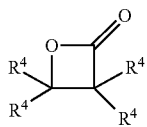

wherein $R^4$ is independently in each occurrence hydrogen, a hydrocarbyl moiety or a fluorocarbyl moiety; the hydrocarbyl or fluorocarbyl moieties may optionally contain at least one heteroatom or at least one substituent. Functionalized beta-propiolactones have at least one $R^4$ present as a hydrocarbyl or fluorocarbyl moiety which may enhance the function of the functionalized beta-propiolactones incorporated into polymer chains useful in coatings or films. At least $R^4$ may be hydrocarbyl or fluorocarbyl groups which may contain one or more of unsaturated groups, electrophilic groups, nucleophilic groups, anionic groups, cationic groups, zwitterion containing groups, hydrophobic groups, hydrophilic groups, halogen atoms, natural minerals, synthetic minerals, carbon-based particles, an ultraviolet active group, a polymer having surfactant properties, and polymerization initiators or reactive heterocyclic rings. The functional groups may be linked to the ring by a linking group (M) which functions to link the functional portion of the groups to the cyclic ring. Exemplary linking groups may be hydrocarbylene, fluorocarbylene groups, ethers, thioethers, polyethers (such as polyalklene ether). One or more, $R^4$ may be a halogen substituted alkyl group, a sulfonic acid substituted alkyloxy group; an alkyl sulfonate alkyloxy group; alkyl ether substituted alkyl group; a polyalkylene oxide substituted alkyl group, an alkyl ester substituted alkyl group; an alkenyloxy substituted alkyl group; an aryl ester substituted alkyl group; an alkenyl group; a cyano substituted alkyl group; an alkenyl ester substituted alkyl group; a cycloalkyl substituted alkyl group; an aryl group; a heteroatom containing cycloalkenyl, alkyl ether substituted alkyl group; a hydroxyl substituted alkyl group, a cycloaliphatic substituted alkenyl group; an aryl substituted alkyl group; a haloaryl substituted alkyl group; an aryloxy substituted alkyl group; an alkyl ether substituted alkaryl group; a hetero atom containing cycloaliphatic group substituted alkyl group; a hetero atom containing aryl substituted alkyl group, an alkyl amide substituted alkyl group, an alkenyl substituted cycloaliphatic group; two of $R^1$ or $R^2$ and $R^3$ or $R^4$ form a cyclic ring, which may optionally contain one or more unsaturated groups; an alkyl group substituted with a beta propiolactone group which may optionally be contain one or more ether groups and/or one or more hydroxyl groups; a glycidyl ether group, or a benzocyclobutene substituted alkyl group, optionally substituted with one or more ether groups. Beta propiolactone corresponds to the formula wherein all $R^4$ are hydrogen.

Disclosed are homopolymers prepared from the one or more functionalized beta propiolactones or beta propiolactones described. Disclosed are copolymers of a beta propiolactone and one or more the functionalized beta propiolactones.

Comonomers

Disclosed are compositions comprising a copolymer of one or more of the beta propiolactones and/or functionalized beta propiolactones disclosed with one or more monomers reactive with the one or more beta propiolactones and/or functionalized beta propiolactones. Disclosed are compositions comprising a copolymer of one or more of the beta propiolactones and/or functionalized beta propiolactones disclosed with one or more monomers reactive with the one or more functionalized beta propiolactones. Such copolymers include a plurality of one or more diols, difunctional polyalkyleneoxides, amine terminated polyalkylene oxides, one or more difunctional polyesters, lactams, lactides, cyclic lactones, cyclic anhydrides, cyclic ethers epoxides, episulfides, aziridines, (meth)acrylates, valerolactones, butyrolactone, glycolides, substituted glycolides or polyethers. Such comonomers may be one or more of epoxides, oxiranes, lactams, and lactides. The comonomer may be one or more cyclic anhydrides including succinic anhydride, methyl succinic anhydride, methyl diglycolic anhydride methyl glutaric anhydride, maleic anhydride, phthalic anhydride, citraconic anhydride and trans-1,2-cyclohexanedicarboxylic anhydride. These copolymers may contain units derived from beta propiolactones. The copolymers disclosed may be block copolymers, random copolymers or one or more chains may be grafted to the polymer backbone.

The one or more substituted beta lactones may be:

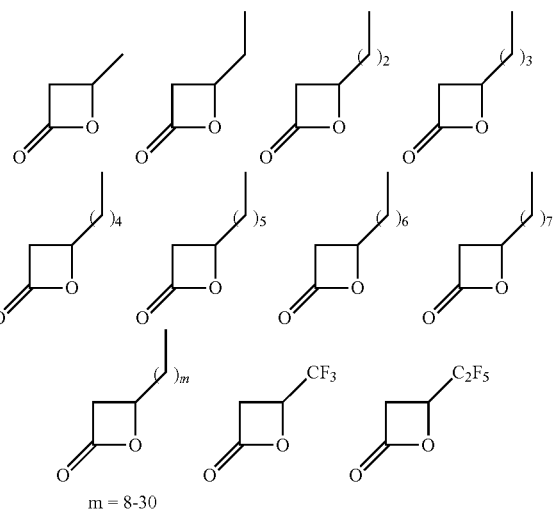

m = 8-30

-continued

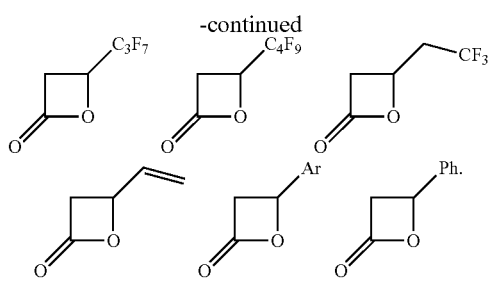

The one or more substituted propiolactones may be:

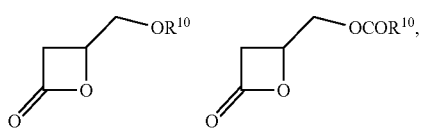

where $R^{10}$ may be the same as $R^1$.

The one or more substituted propiolactones may be

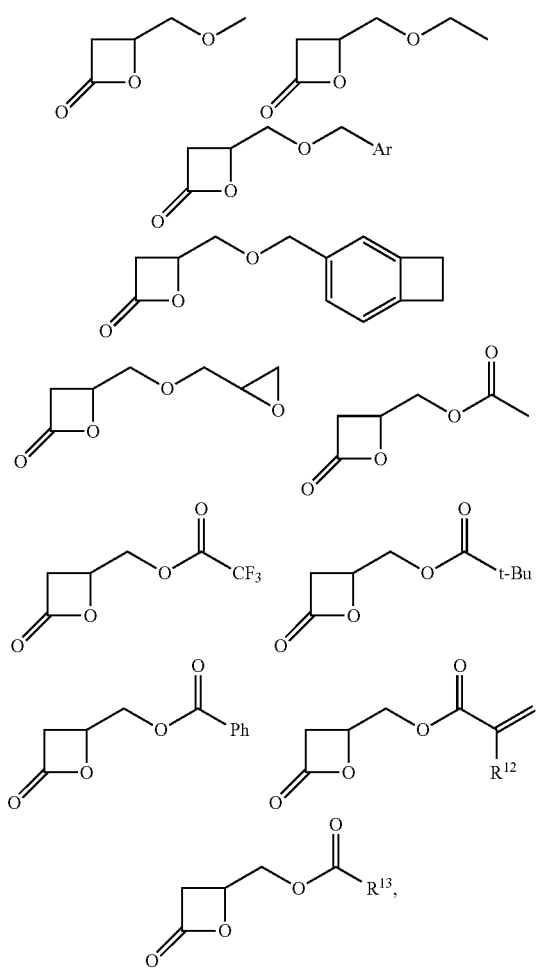

where Ar is any optionally substituted aryl group, $R^{12}$ is selected from the group consisting of: —H, optionally substituted $C_{1-40}$ aliphatic, optionally substituted $C_{1-20}$ heteroaliphatic, and optionally substituted aryl, and $R^{13}$ is a fully or partially unsaturated $C_{2-20}$ straight chain aliphatic group. The polymers may be prepared from a mixture of BPL and pivalolactone:

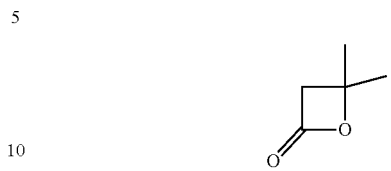

The one or more substituted propiolactones may be:

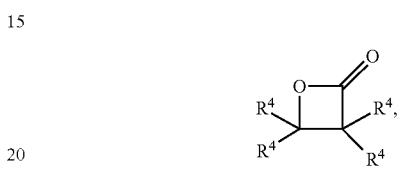

where $R^4$ is as defined herein. Each $R^4$ on one carbon atom may be independently —H and —$CH_3$, and both $R^4$ on the other carbon atom may be —H.

The one or more substituted propiolactones may be:

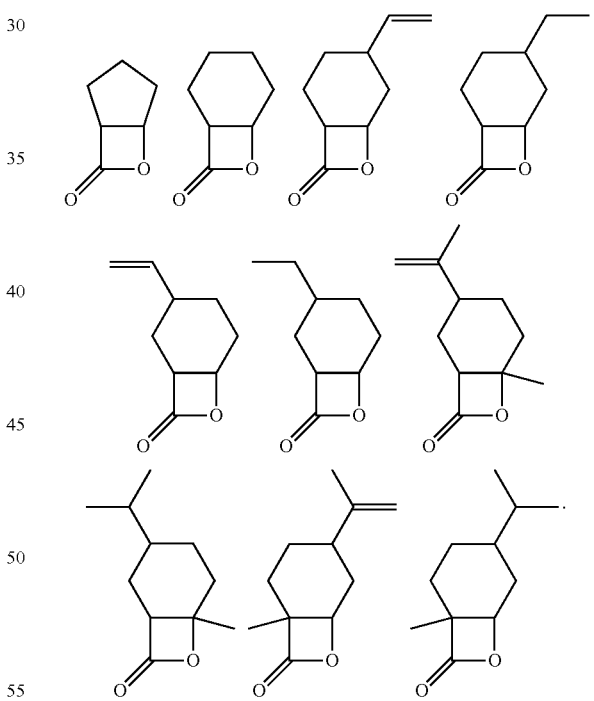

The polymers may be prepared from a mixture of BPL and a beta lactone of one of the formulas:

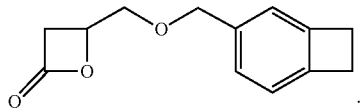

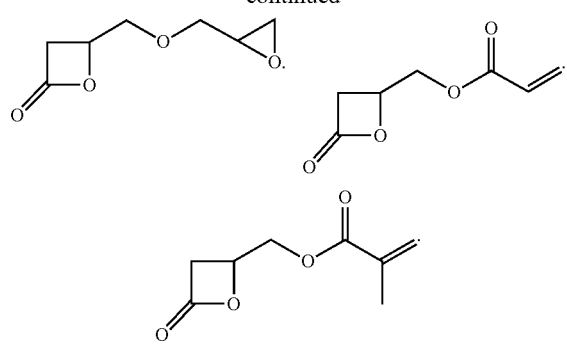

The polymers may be prepared from a mixture of BPL and one or more substituted propiolactones wherein the substituted lactone is provided as a mixture of regioisomers. Any of the substituted beta lactone comonomers described above may be provided in combination with their regioisomer(s). Where a substituted beta lactone comonomer is provided as a regioisomeric mixture, the regioisomer with the largest substituent on the carbon adjacent to the ring oxygen atom is present in molar excess relative to the other regioisomer. The major regioisomer is present in a ratio of 2:1 or greater relative to the minor regioisomer, at least 3:1, at least 5:1, at least 10:1, at least 20:1, at least 30:1, at least 40:1, at least 50:1, or at least 100:1 relative to the minor regioisomer.

The polymers may be prepared from a mixture of BPL and one or more cyclic ethers including tetrahydrofuran, substituted tetrahydrofurans and epoxides. The epoxide may be a substituted epoxide, ethylene oxide, propylene oxide, butylene oxide, 4-vinylcyclohexene oxide, 4-ethylcyclohexene oxide, limonene oxide, a glycidol ether, glycidol ester or cyclohexene oxide. The epoxides may correspond to the formula:

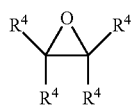

where $R^4$ is as defined herein.

The one or more substituted epoxides may correspond to the formula:

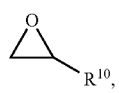

where $R^{10}$ is as defined above.

The one or more substituted epoxides may be:

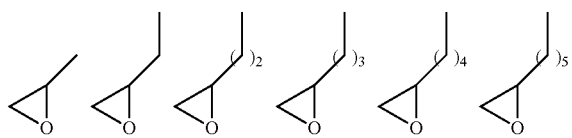

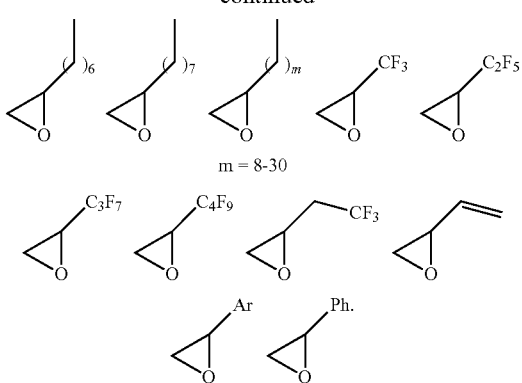

The one or more substituted epoxides may correspond to one of the formulas:

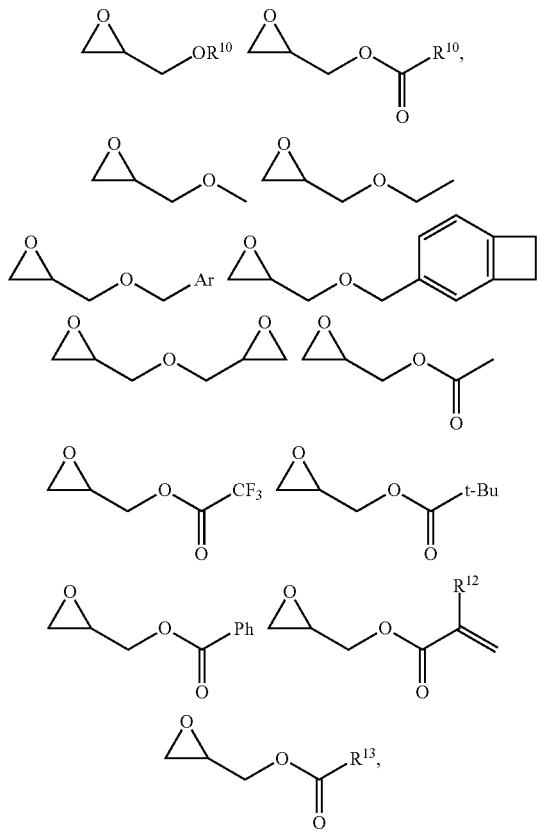

where each of Ar, $R^{10}$, $R^{12}$, and $R^{13}$ is as defined above.

The one or more substituted epoxides may correspond to one of the formulas:

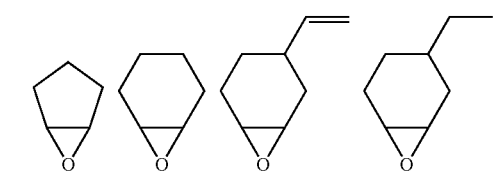

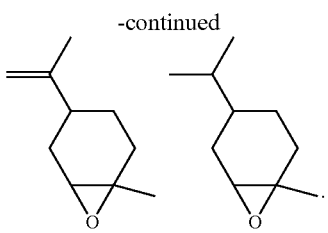

In methods where a co-monomer is present with the BPL, the co-monomer may be added at the beginning of the process along with the BPL—for example, a batch polymerization may be performed using a defined mixture of BPL and one or more comonomers. The methods may include changing the monomer composition over time by the addition of additional monomers to the polymerization mixture. Such additions may comprise continuous addition of BPL, comonomer(s) or mixtures of BPL and comonomers. Such additions may comprise batch-wise addition of BPL, comonomer(s) or mixtures of BPL and comonomers. Depending on the provided reaction conditions and the relative rates of polymerization of the comonomers under the conditions of the polymerization, such methods may lead to random copolymers, tapered copolymers, or block copolymers.

Chain Transfer Agents,

The methods include the use of chain extenders, chain transfer agents, and/or crosslinking agents. The methods may comprise contacting beta propiolactone (and optional comonomers) with the initiator in the presence of one or more chain transfer agents. Chain transfer agents are defined as any substance or reagent capable of terminating growth of one polymer chain and initiating polymerization of a new polymer chain. In a living polymerization this may be a reversible process and the net effect is that, on average in the composition, all chains grow at similar rates. Chain transfer agents can be used to control the molecular weight of the produced polymer composition, to optimize the amount of catalyst used, and/or to control the polydispersity of the produced polymer composition. Chain transfer agents can also be used to introduce additional functional groups at chain ends (e.g. for subsequent cross-linking or chain extension reactions, or to impart particular physical properties such as hydrophilicity or hydrophobicity etc.) examples of the latter would include chain transfer agents having radically polymerizable functional groups such as vinyl groups, perfluorinated moieties or siloxy groups.

Chain transfer agents may comprise acidic compounds. Such acidic compounds may be characterized in that their conjugate bases are nucleophilic. The conjugate base of a provided acidic chain transfer agent may have sufficient nucleophilicity to ring open beta propiolactone (or to react with a provided comonomer). Exemplary chain transfer agents include carboxylic acids, sulfonic acids, phosphoric acids, phoshonic acids, phosphinic acids, thiocarboxylic acids, dithiocarboxylic acids, thiols, phenols, and the like. Chain transfer agents may comprise compounds of formula Y'-T-(Y')$_r$, where each Y' is, independently an acidic functional group (or a salt formed by deprotonation of such a group), -T- is a multivalent moiety, and r is 0 or an integer between 1 and 10. Y' may be, independently selected from a carboxylic acid, sulfonic acid, phosphoric acid, phoshonic acid, phosphinic acid, thiocarboxylic acid, dithiocarboxylic acid, a thiol, and a phenolic —OH group, (or an anion formed by deprotonation of any of these). The chain transfer agents may comprise molecules having more than one functional group capable of acting as a chain transfer agent (e.g. dicarboxylic acids, tricarboxylic acids, etc.). The chain transfer agents may comprise carboxylic acids, such as formic acid, acetic acid, propionic acid, 3-hydroxypropionic acid, 3-hydroxybutanoic acid, lactic acid, benzoic acid, acrylic acid, and methacrylic acid. The chain transfer agent may comprise a phenol, a thiol or a derivative thereof.

The CTA may be present at the beginning of the reaction, or it may be added during the polymerization process (either continuously at a constant or variable rate, or by portion-wise addition). The addition of CTA may be used to control the molecular weight distribution of the polymer composition formed. The CTA may be added portion-wise at one or more time points in the reaction to provide a polymer composition with a bi- or multi-modal molecular weight distribution. The CTA may be added continuously during at least part of the polymerization process to provide a polymer composition with a broadened molecular weight distribution. Where the CTA is added at the beginning of the polymerization reaction, the result is a polymer composition with a narrow PDI. The chain transfer agent may be provided at a molar ratio of from about 1:1 to about 10,000:1 relative to the polymerization initiator, or from about 1:1 to about 10:1, e.g. 1:1, 2:1, 3:1, 4:1, 5:1, 6:1, 8:1 or 10:1 or from about 10:1 to about 100:1, e.g. 20:1, 30:1, 40:1, 50:1, 75:1, or 100:1, or about 100:1 to about 1,000:1, e.g. 200:1, 300:1, 400:1, 500:1, 750:1, or 1000:1

The polymerization methods are integrated into a process for production of beta lactones. Such integrated processes can have advantages in terms of energy efficiency and can lead to higher quality polymer products due to reduced introduction of water, oxygen or other impurities. The methods may include a step of reacting an epoxide, such as, ethylene oxide with carbon monoxide to form a beta lactone, such as beta propiolactone. Exemplary catalysts and methods for such processes are described in Published Patent Applications: WO2013/063191, WO2014/004858, WO2003/050154, WO2004/089923, WO2012/158573, WO2010/118128, WO2013/063191, and WO2014/008232; in U.S. Pat. Nos. 10,662,283, 5,359,081 and 5,310,948 and in the publication "Synthesis of beta-Lactones" J. Am. Chem. Soc., vol. 124, 2002, pages 1174-1175. the entire contents of each of which is incorporated herein by reference. The methods may comprise the steps of: contacting an epoxide with carbon monoxide in the presence of a carbonylation catalyst and a solvent to provide reaction stream comprising a beta lactone; separating a product stream comprising beta lactone from the reaction stream, and feeding the beta lactone-containing reaction stream into a polymerization reactor and contacting it with a polymerization initiator (optionally in the presence of one or more comonomers) to provide a second reaction stream containing a biodegradable polyester. Such integrated carbonylation/polymerization processes may be characterized in that substantially all carbonylation catalyst is removed from the reaction stream comprising beta lactone prior to feeding the stream into the polymerization reactor. Such integrated carbonylation/polymerization processes are characterized in that at least a portion of the solvent in which the carbonylation process is performed is present in the reaction stream comprising beta lactone and is fed into the polymerization reactor. The method may comprise separating the solvent from the second reaction stream containing the polymer. The method may comprise recycling the separated solvent back to the carbonylation reaction. The processes may be characterized in that the reaction stream comprising beta lactone contains residual epoxide and the beta lactone epoxide mixture is fed into the polymerization reactor. The epoxide may comprise a comonomer in the BPL polymerization.

Initiators

The methods described herein include a step of contacting beta lactones and optional comonomers with polymerization initiators that are one or more carboxylate salts of an onium cation. The carboxylate salts of an onium cation may comprise any compounds having the residue of an onium cation and a carboxylate group in a salt form. The carboxylate portion may have a hydrocarbyl group bonded to the carbonyl group and which may be optionally substituted. The hydrocarbyl group may be an alkyl, aryl or alkaryl group. The alkyls group may be a $C_{1-20}$ straight or branched chain, optionally substituted with a substituent which does not interfere in the ability of the salt to function as an anionic intiator. The hydrocarbyl group may be a $C_{1-8}$ straight or branched alkyl group which may be optionally substituted, a $C_{1-4}$ straight or branched alkyl group, a methyl or ethyl group or a methyl group. The onium cation can be any onium cation which forms a salt with the carboxylate, which does not interfere with carboxylate forming an anion which can initiate anionic polymerization. Exemplary oniums contain one or more of the onium cations containing nitrogen, phosphorus, sulfur, antimony or arsenic. Exemplary oniums contain one or more of nitrogen, phosphorus or sulfur. The oniums may contain one or both of nitrogen and phosphorus. The oniums may contain nitrogen. The carboxylate salts of onium ions may correspond to the formula:

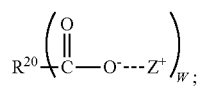

wherein $R^{20}$ is separately in each occurrence hydrocarbyl group which may be optionally substituted, w is separately in each occurrence a number of 1 or greater and Z is an onium cation as described herein. $R^{20}$ may be multivalent having w valences. $R^{20}$ may be an alkyl, aryl or alkaryl group. $R^{20}$ may be a $C_{1-20}$ straight or branched chain optionally substituted with a substituent which does not interfere in the ability of the salt to function as an anionic intiator. $R^{20}$ may be a $C_{1-8}$ straight or branched alkyl group which may be optionally substituted, a $C_{1-4}$ straight or branched alkyl group, a methyl or ethyl group or a methyl group. A may be separately in each occurrence polymer chain comprising units derived from a beta lactone, such as 3-hydroxypropionate and/or substituted 3-hydroxypropionate. W may be separately in each occurrence a number of 2 or greater, 1 to 6, 2 to 6 or 2 to 3.

Cationic Groups ($Z^+$)

The initiators comprise organic "onium cations". Such onium cations contain the heteroatoms such as nitrogen, phosphorus, sulfur, antimony or arsenic; or nitrogen, phosphorous or sulfur (or combinations of two or more of these). The initiators may comprise a nitrogen-based onium cation, which may be one or more ammonium, amidinium, and guanidinium cations, an onium cation based on a nitrogen-containing heterocycle such as an optionally substituted pyridinium, imidazolium, pyrrolidinium, or piperidinium. The onium cation may be:

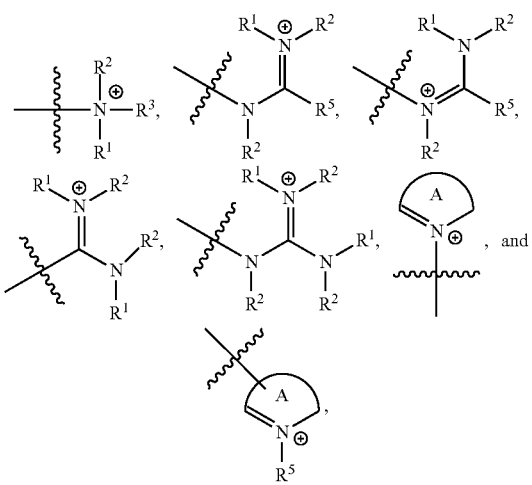

wherein: $R^1$, $R^2$, and $R^3$ is in this context, independently at each occurrence, an optionally substituted radical selected from the group consisting of: $C_{1-40}$ aliphatic; $C_{1-40}$ heteroaliphatic; phenyl; a 3- to 8-membered saturated or partially unsaturated or aromatic monocyclic carbocycle; a 7-14 carbon saturated, partially unsaturated or aromatic polycyclic carbocycle; a 5- or 6-membered monocyclic heteroaryl ring having 1-4 heteroatoms independently selected from nitrogen, oxygen, or sulfur; a 3- to 8-membered saturated or partially unsaturated heterocyclic ring having 1-3 heteroatoms independently selected from nitrogen, oxygen, and sulfur; a 6- to 12-membered polycyclic saturated or partially unsaturated heterocycle having 1-5 heteroatoms independently selected from nitrogen, oxygen, or sulfur; an 8- to 10-membered bicyclic heteroaryl ring having 1-5 heteroatoms independently selected from nitrogen, oxygen, or sulfur; and a polymer chain, wherein any two or more $R^1$, $R^2$, and $R^3$ groups can optionally be taken together with intervening atoms to form one or more optionally substituted, optionally unsaturated rings optionally containing one or more additional heteroatoms; $R^5$ is, independently at each occurrence, hydrogen or an optionally substituted radical selected from the group consisting of $C_{1-40}$ aliphatic; $C_{1-40}$ heteroaliphatic; a 3- to 8-membered saturated or partially unsaturated monocyclic carbocycle; a 7- to 14-membered saturated or partially unsaturated polycyclic carbocycle; a 5- to 6-membered monocyclic heteroaryl ring having 1-4 heteroatoms independently selected from nitrogen, oxygen, or sulfur; an 8- to 14-membered polycyclic heteroaryl ring having 1-5 heteroatoms independently selected from nitrogen, oxygen, or sulfur; a 3- to 8-membered saturated or partially unsaturated monocyclic heterocyclic ring having 1-3 heteroatoms independently selected from nitrogen, oxygen, or sulfur; a 6- to 14-membered saturated or partially unsaturated polycyclic heterocycle having 1-5 heteroatoms independently selected from nitrogen, oxygen, or sulfur; phenyl; an 8- to 14-membered polycyclic aryl ring; and a polymer chain; wherein two $R^5$ groups or an $R^5$ and one or more $R^1$ and/or $R^2$ groups can be taken together with intervening atoms to form one or more optionally substituted carbocyclic, heterocyclic, aryl, or heteroaryl rings; and Ring A is an optionally substituted, 5- to 10-membered ring optionally containing one or more additional heteroatoms and/or sites of unsaturation.

The cation may be quaternary ammonium cation. The quaternary ammonium cation may correspond to the formula:

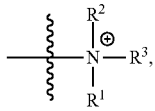

where each of $R^1$, $R^2$, and $R^3$ is as defined above. Each of $R^1$, $R^2$, and $R^3$ may be independently a $C_{1-20}$ aliphatic group a $C_{1-12}$ aliphatic group, $C_{1-8}$ aliphatic group, a $C_{1-9}$ aliphatic group, or a $C_{1-4}$ aliphatic group or methyl, ethyl, n-propyl, isopropyl, n-butyl, sec-butyl, t-butyl, 2-ethylhexyl, and $C_{8-20}$ alkyl. At least one of $R^1$, $R^2$, and $R^3$ may be methyl, two of $R^1$, $R^2$, and $R^3$ may be methyl and the third group may be a $C_{2-20}$ alkyl chain, or $R^1$, $R^2$, and $R^3$ may each be methyl. One of $R^1$, $R^2$, and $R^3$ may be a polymer chain or a hydrophobic moiety. Two or more $R^1$, $R^2$, and $R^3$ groups may be taken together to form a ring, such as a 5- or 6-membered saturated, or unsaturated ring optionally containing one or more additional heteroatoms. The ammonium cation may be

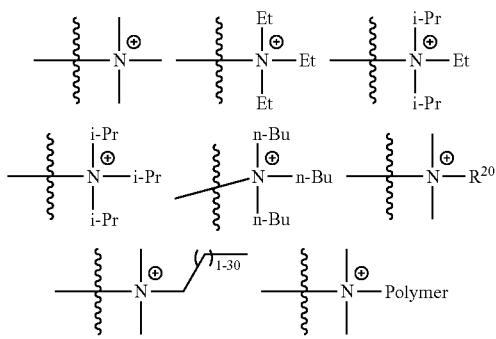

where $R^{20}$ is selected from optionally substituted $C_{2-40}$ aliphatic, optionally substituted aryl, optionally substituted benzyl, and a polymer chain.

The initiators may comprise a phosphorous-based cation. The initiators may comprise a phosphonium cation. The initiators may comprise a phosphonium salt of formula:

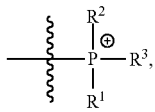

wherein each of $R^1$, $R^2$, and $R^3$ is as defined above. At least one or all of $R^1$, $R^2$, and $R^3$ may be an aryl group, for example phenyl. At least one of $R^1$, $R^2$, and $R^3$ may be a polymer chain, the polymer chain may be linked to the phosphorous atom through an aryl ring. The phosphonium cation may be:

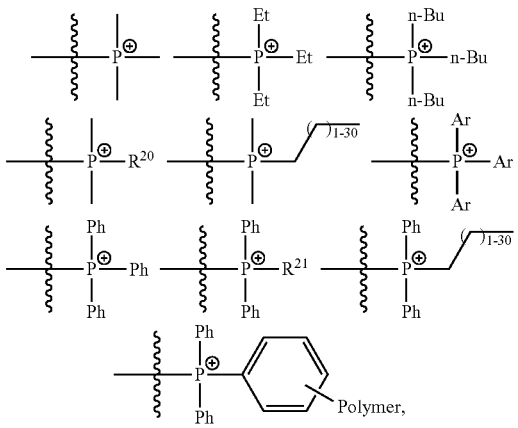

where each of Ar and $R^{20}$ is as defined above; and may be optionally be substituted aryl, optionally substituted heteroaryl, or a polymer chain.

The cation may be an amidinium cation. The cation may be:

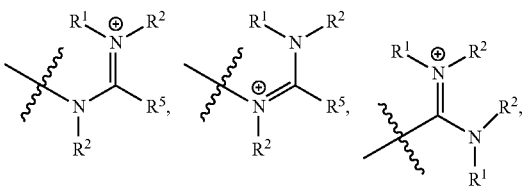

where each of $R^1$, $R^2$ and $R^5$ are as defined above. In this context each of $R^1$, $R^2$, and $R^3$ may be independently a $C_{1-12}$ aliphatic group, $C_{1-8}$ aliphatic group, a $C_{1-9}$ aliphatic group, or a $C_{1-4}$ aliphatic group. $R^1$, $R^2$, and $R^3$ may be independently selected from methyl, ethyl, n-propyl, isopropyl, n-butyl, sec-butyl, t-butyl, 2-ethylhexyl, and $C_{8-20}$ alkyl. At least one of $R^1$, $R^2$, and $R^3$ may be methyl. Two or more of $R^1$ and $R^2$ groups in such amidines may together to form a ring, such as a 5- or 6-membered saturated or unsaturated ring. The cation may be a bicyclic amidinium group, which may have one nitrogen atom bearing three nonhydrogen substituents and a second nitrogen atom with bonds to four nonhydrogen substituents. Such nonhydrogen substituents may be aliphatic substituents or the rings of the bicyclic amidinium group. The amidinium cation may be:

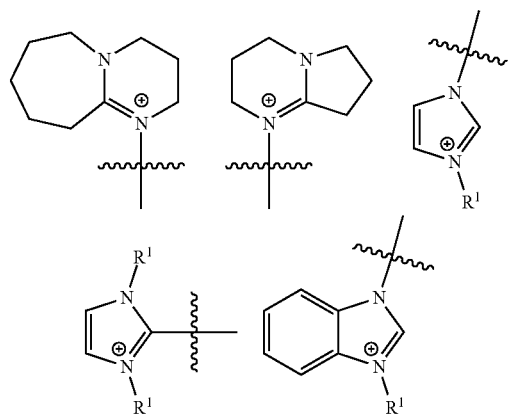

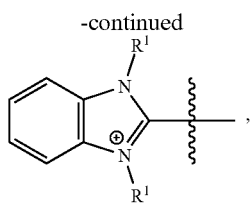

where R$^1$ is as defined above.

The cation may be a guanidinium cation, which can be depicted in more than one resonance structure (e.g. where the positive charge exists on different nitrogen atoms) these depictions are not meant to be limiting and it is to be understood that all resonance forms of such cations are encompassed even if not explicitly depicted herein. The cations may be:

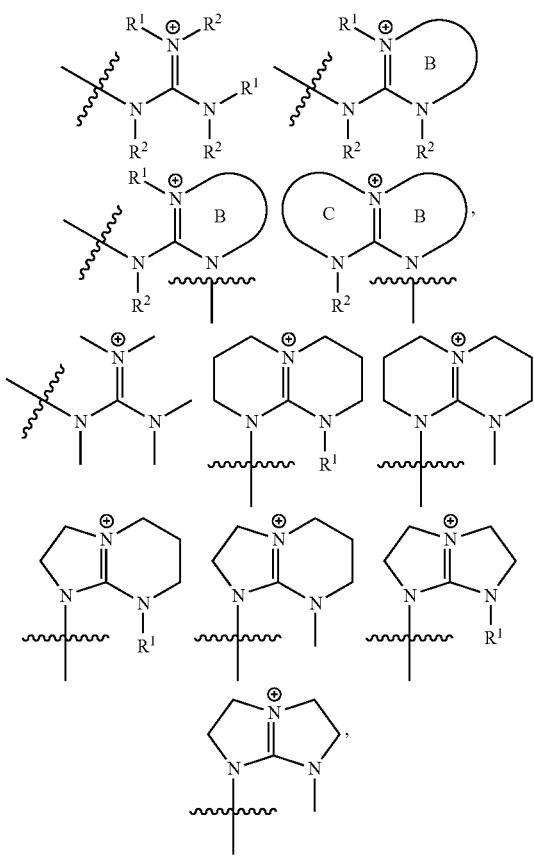

where R$^1$ is as defined above. In this context each of R$^1$, R$^2$, and R$^5$ in this context may be independently a C$_{1-12}$ aliphatic group, C$_{1-8}$ aliphatic group, a C$_{1-9}$ aliphatic group, or a C$_{1-4}$ aliphatic group, and C and D represent 5- to 8-membered saturated or partially unsaturated rings. Each of R$^1$, R$^2$, and R$^3$ may be independently selected from the group consisting of methyl, ethyl, n-propyl, isopropyl, n-butyl, sec-butyl, t-butyl, 2-ethylhexyl, and C$_{8-20}$ alkyl. At least one of R$^1$, R$^2$, and R$^3$ may be methyl. Two or more R$^1$ and R$^2$ groups in such amidines may be taken together to form a ring, such as a 5- or 6-membered saturated or unsaturated ring. The cation may be a bicyclic amidinium group, the bicyclic amidinium groups may have one nitrogen atom bearing three nonhydrogen substituents and a second nitrogen atom with bonds to four nonhydrogen substituents. Such nonhydrogen substituents may be aliphatic substituents or the rings of the bicyclic amidinium group.

The cations may comprise a sulfur-based onium salt, such as a sulfonium salt. The sulfonium salt of may be:

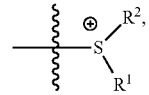

wherein each of R$^1$ and R$^2$ is as defined above. In this context, R$^1$ and R$^2$ may each be methyl.

The cation may be a sulfoxonium cation, which may be:

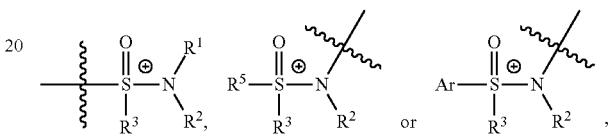

wherein each of R$^1$, R$^2$, R$^3$, and R$^5$ is as defined above. In this context, R$^1$ and R$^2$ each may be methyl, and/or R$^5$ may be methyl. In this context, at least one of R$^3$ and R$^5$ may be an optionally substituted aryl group.

The cation may comprise both nitrogen and phosphorous atoms, such as a phosphazenium cation. The phosphazenium cation may be:

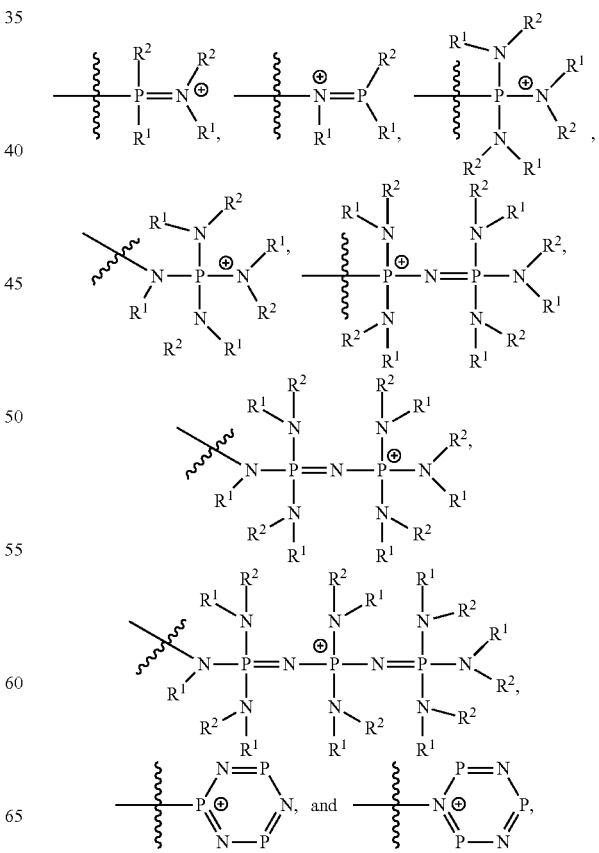

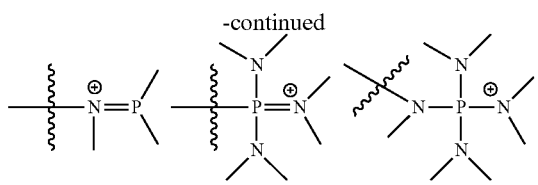

R¹, R², and R³ in this context are each independently selected from $C_{1-40}$ aliphatic or an optionally substituted phenyl group, a $C_{1-40}$ aliphatic group, $C_{1-20}$ fluorinated aliphatic and optionally substituted aryl, a $C_{1-40}$ aliphatic group, a $C_{1-20}$ aliphatic group, a $C_{1-12}$ aliphatic group or a phenyl group, a $C_{1-12}$ aliphatic group, a $C_{1-8}$ aliphatic group, a $C_{1-6}$ aliphatic group, or a $C_{1-4}$ aliphatic group. R¹, R², and R³ may each be methyl, ethyl, butyl, optionally substituted phenyl group, phenyl or trifluoromethyl. R¹ and R², may each be methyl and R³ may be a $C_{2-20}$ aliphatic group or an optionally substituted phenyl group. At least one of R¹, R², and R³ may be a $C_{1-20}$ fluorinated aliphatic group, a $C_{1-12}$ aliphatic group, a $C_{1-8}$ fluorinated aliphatic group, a $C_{1-6}$ fluorinated aliphatic group, or a $C_{1-4}$ fluorinated aliphatic group, trifluoromethyl. In this context, each R¹ and R² group present may be methyl.

Complexing Agents

Methods disclosed may comprise contacting monomers with the initiator in the presence of a complexing agent. Addition of complexing agents may improve the methods by increasing the rate of the polymerization, enhancing the yield of polymer, or may result in improved polymer properties through control of properties such as molecular weight or polydispersity. Exemplary complexing agents comprise crown ethers, and other macro polyheterocycles containing rings with a plurality of heteroatoms of —O—, —NR—, and —S—. Complexing agents comprise crown ethers. Exemplary crown ethers include, but are not limited to, those described in the thesis titled *APPLICATIONS OF CROWN ETHERS IN INDUSTRIAL ANIONIC POLYMERIZATIONS* (Thomas Newton Montgomery, Jr.; Georgia Institute of Technology, December 1977) the entire content of which is incorporated herein by reference. Exemplary complexing agents include: 1,4,7,10,13,16-hexaoxacyclooctadecane (18-crown-6); 1,4,7,10,13-pentaoxacyclopentadecane (15-crown-5) 1,4,7,10-tetraoxacyclododecane (12-crown-4), dibenzo 18-crown-6, 21-crown-7, and derivatives or mixtures of any of these. The complexing agent may comprise 15-crown-5 or 12-crown-4. Crown ethers may be selected on the basis of its ability to effectively form a complex with the cationic functional group present in the polymerization initiator used in the process. Complexing agents comprise macro heterocycles comprising heteroatoms other than oxygen. Complexing agents may comprise crown ethers where one or more oxygen atoms is replaced by a nitrogen or sulfur atom. The complexing agents may comprise aza-crown ethers, such as 4,7,13,16,21-Pentaoxa-1,10-diazabicyclo[8.8.5]tricosane; 1,4,8,12-Tetraazacyclopentadecane; and 1,4,10,13-Tetraoxa-7,16-diazacyclooctadecane. The complexing agents may comprise those described in U.S. Pat. No. 3,890,278, the entirety of which is incorporated herein by reference. The complexing agents may comprise thia-crown ethers.

The complexing agent may be introduced at the beginning of the polymerization process or at any later time. The complexing agent may be added at the same time as the initiator. The complexing agent may be provided as a mixture or solution with the polymerization initiator and the mixture may be fed to the reaction as described above for addition of the initiator. The complexing agent may be used in a molar ratio from about a 1:100 to about a 100:1 relative to the polymerization initiator, 1:10 to 10:1 or 1:2 to 2:1 relative to the polymerization initiator. The chain transfer agent may be utilized in the method, the complexing agent may be provided at a molar ratio relative to the CTA ranging from 1:10 to 10:1, 1:5 to 5:1, or 1:2 to 2:1.

Polymer Compositions

Disclosed are polymer compositions. The polymer compositions may comprise polymer chains of the formula: according to one of the formulas:

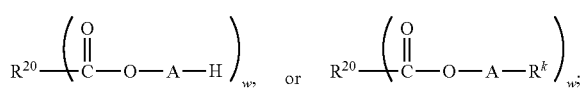

wherein: A is separately in each occurrence a polymer chain having ring opened lactones, such as beta propiolactone, and/or substituted beta lactone units;
$R^{20}$ is separately in each occurrence a hydrocarbyl group which is optionally substituted;
$R^k$ is separately in each occurrence the residue of an endcapping agent or a quenching agent; and
w is separately in each occurrence a number of 1 or greater. Residue of a quenching agent or an endcapping agent is the portion of the quenching agent or an endcapping agent covalently bonded to the end of the polymer chains, as described herein.

A may comprise a polypropiolactone, poly(3-hydroxypropionate), chain—e.g. a polymer chain having units of the formula:

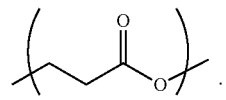

-(A)- may comprise a copolymer of beta propiolactone with one or more comonomers as disclosed herein (A)- may have one of the formulas:

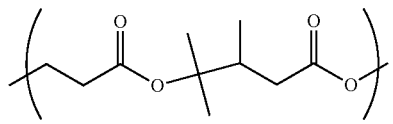

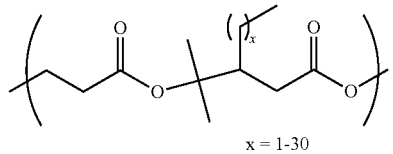

x = 1-30

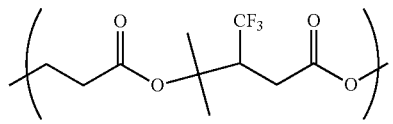

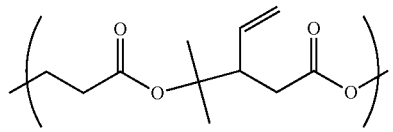

-continued

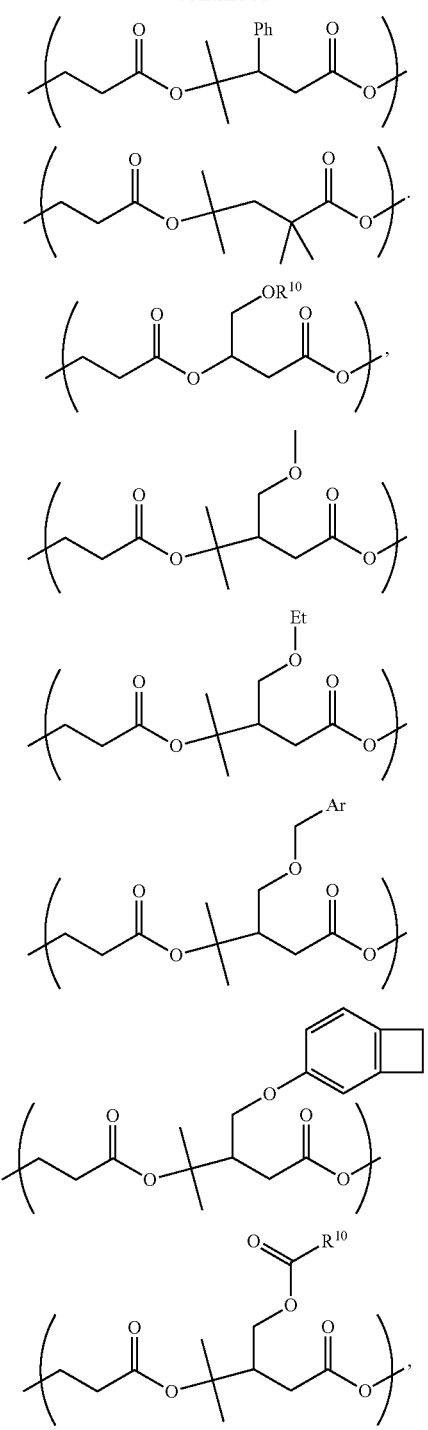

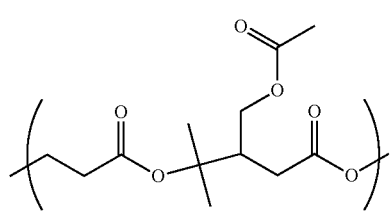

-continued

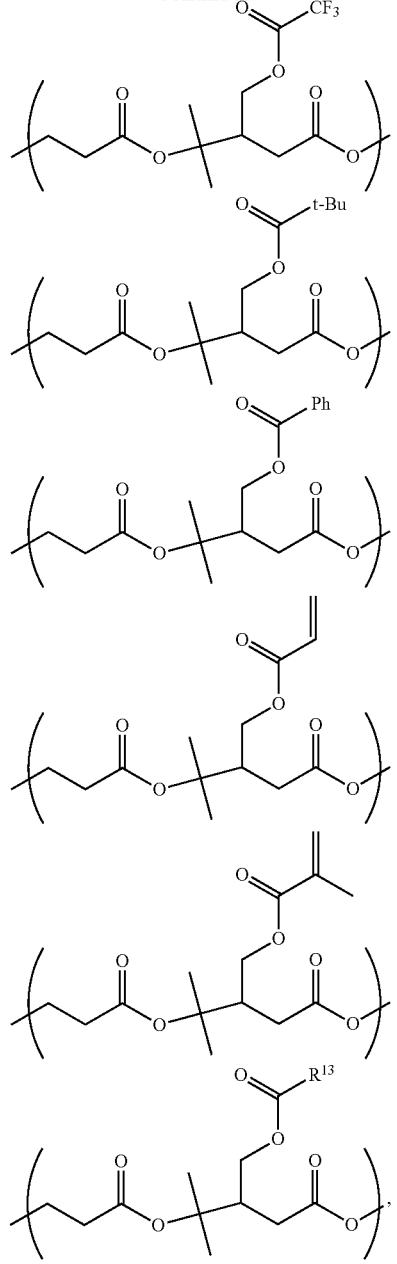

where $R^{10}$ and $R^{13}$ is as defined above.

Where -(A)- comprises a copolymer of beta propiolactone and one or more substituted beta lactones, the substituted beta lactone monomer may be present as a mixture of regioisomers. By way of illustration in certain embodiments, such a copolymer may have units of the formula:

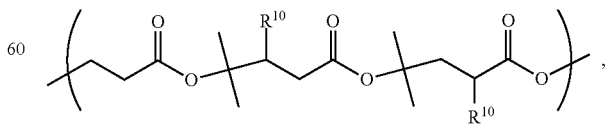

where $R^{10}$ is as defined above.

The copolymers may be polymers of the propiolactone with regioisomeric mixtures of any of the substituted beta lactones described above and herein. A may comprise a copolymer of beta propiolactone and one or more epoxides, which may have units corresponding to the formula:
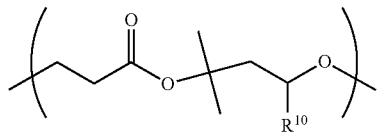
A may comprise a beta propiolactone epoxide copolymer which may have units corresponding to one of the formulas:
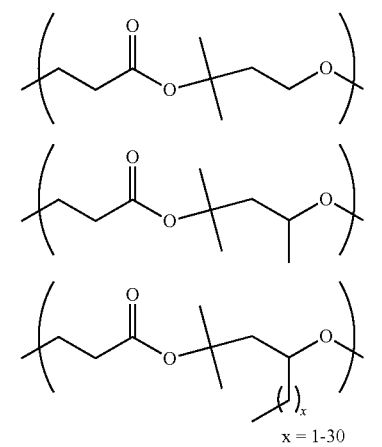
x = 1-30
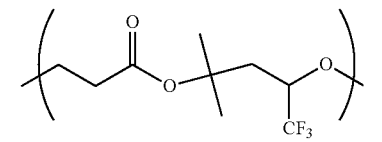
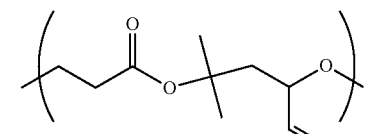
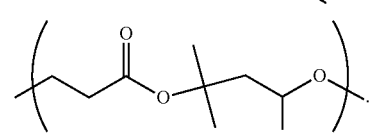
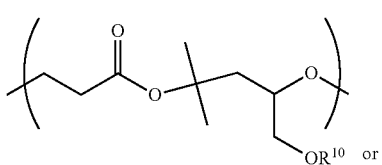
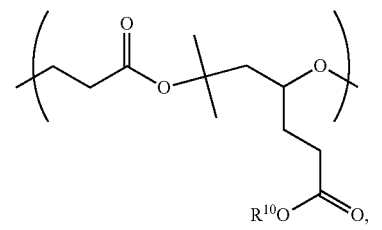
-continued
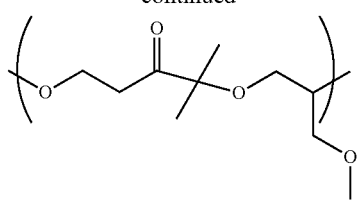
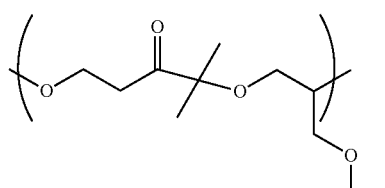
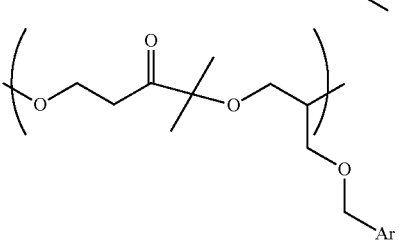
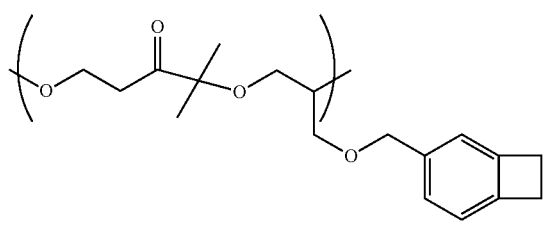
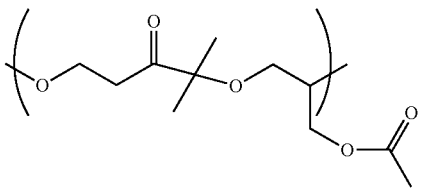
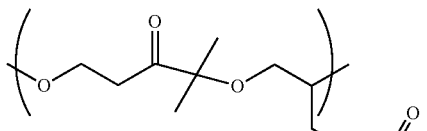
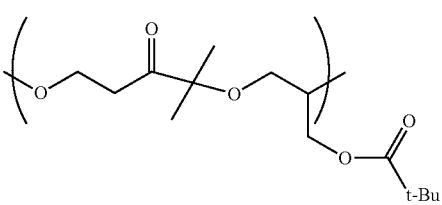
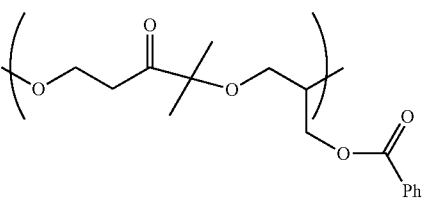

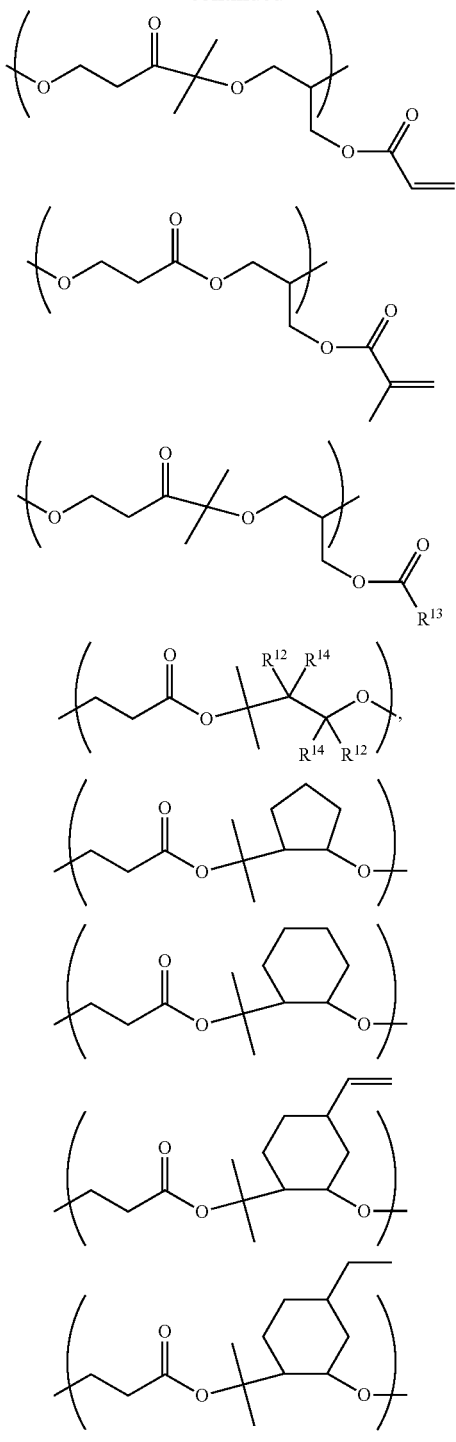

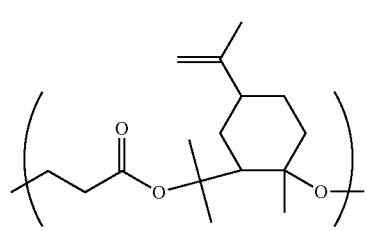

where each of $R^{10}$, $R^{12}$ and $R^{14}$ are as defined above

A may comprise a copolymer of beta propiolactone and lactide, which may have units corresponding to one of the formulas

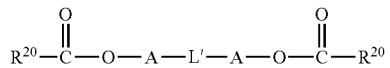

A may be a copolymer of beta propiolactone and caprolactone, which may have units corresponding to the formula:

A may comprise a copolymer of beta propiolactone and two or more additional comonomers, such as any two or more of the epoxide comonomers, any two or more of the substituted beta propiolactone comonomers, at least one epoxide and at least one substituted beta propiolactone, at least one epoxide and lactide, at least one epoxide and caprolactone, at least one substituted beta propiolactone and lactide at least one substituted beta propiolactone and caprolactone, or lactide and caprolactone.

The polymer compositions may comprise polymer chains which have been chain extended which may correspond to the formula:

$$R^{20}-\overset{O}{\underset{\|}{C}}-O-A-L'-A-O-\overset{O}{\underset{\|}{C}}-R^{20}$$

where each of A, $R^{20}$ is as defined above.

L'- is an optionally substituted $C_{1-100}$ aliphatic group, —an optionally substituted $C_{1-40}$ aliphatic group; an optionally substituted $C_{1-24}$ aliphatic group, an optionally substituted $C_{1-20}$ aliphatic group an optionally substituted $C_{1-12}$ aliphatic group, an optionally substituted $C_{2-10}$ aliphatic group; an optionally substituted $C_{4-8}$ aliphatic group, an optionally substituted $C_{4-6}$ aliphatic group, an optionally substituted $C_{2-4}$ aliphatic group, an optionally substituted $C_{1-3}$ aliphatic group, an optionally substituted $C_{6-12}$ aliphatic group, or an optionally substituted $C_1$, $C_2$, $C_3$, $C_4$, $C_5$, $C_6$, $C_7$ or $C_8$ aliphatic group. L'- may be an optionally substituted straight alkyl chain or optionally substituted branched alkyl chain. -L'- may be a $C_{1-20}$ alkyl group having one or more methylene groups replaced by —$C(R^aR^b)$— where $R^a$ and $R^b$ are each independently $C_{1-4}$ alkyl groups. L'- may be an aliphatic group having 2 to 30 carbons including one or more gem-dimethyl substituted carbon atoms. L'- may include one or more optionally substituted rings such as saturated or partially unsaturated carbocyclic, saturated or partially unsaturated heterocyclic, aryl, and heteroaryl. L'- may be a substituted ring (i.e. the X' groups are directly linked to atoms composing the ring in -L'-). The ring may be part of an -L'- moiety having one or more non-ring heteroatoms or optionally substituted aliphatic groups separating one or more of the X' group(s) from the ring. L'- may contain one or more heteroatoms in its main chain (i.e. in the group of covalently linked atoms separating the site(s) of attachment of the —X' groups). L'- may comprise a moiety corresponding to the structure resulting from replacing one or more $sp^2$ carbon atoms of an optionally substituted $C_{4-40}$ aliphatic moiety with a group selected from: —O—, —$NR^1$—, —S—, —S(O)—, —$S(O)_2$—, —OC(O)—, —OC(O)O—, —$NR^1C(O)O$—, —$NR^1C(O)NR^1$—, —N═N—, —$NR^1C(O)$—, —$NR^1C(N)NR^1$—, —SC(O)—, —SC(O)S—, —SC(S)S—, —$NR^1C(O)S$—. and —$NR^1C(S)O$—, where $R^1$ is as defined above. Where more than one such substitution is present, they are separated by at least one aliphatic carbon atom, at least two aliphatic carbon atoms. L'- may comprise one or more ether linkages one or more ester linkages, one or more urethane linkages and/or one or more amide linkages. L'- may comprise an oligomer or a polymer. The polymer may be one or more of polyolefins, polyethers, polyesters, polycarbonates, polyamides, and polyimides. Where -L'- comprises a polymer, the X' groups may be present on the ends of the polymer chains. L' may be a bivalent phenylene. L' may be multivalent.

Polymer compositions containing poly functional chain extending agents may comprise polymer chains of formula:

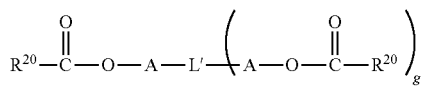

where g is an integer from 2 to about 50, and each of A, $R^{20}$ and L" is as defined above. The polymer compositions may be characterized in that they comprise two or more distinct populations of polymer chains differentiated by the initiating groups present on the chains. Such a composition may arise for example where a mixture of different initiators is employed or when a chain transfer agent is present during the polymerization. In the former case, the resulting mixtures will comprise two or more different polymer chains which have different structures conforming the formulas described herein. Such mixtures are specifically contemplated and disclosed herein. Mixtures of this type may be useful where the polymer bound initiator imparts specific characteristics (e.g. hydrophilicity, hydrophobicity, affinity for particular surfaces, antimicrobial properties and the like) and there is a desire to optimize or modify such characteristics.

The polymer compositions comprise a mixture of polymer chains of formulas described above chains resulting from action of chain transfer agent of formula Y'-T(-Y')$_g$: wherein the polymer chains may correspond to the formula: T-[Y'-(A)-H]$_{g+1}$.

Disclosed are polymer compositions comprising polymer chains of disclosed above in combination with polymer chains of formula above where g is 0, for example the polymer chains of one of the formulas T-CO$_2$-(A)-H, T-SO$_3$-(A)-H, T-S-(A)-H (where S is a sulfur atom), T-CS$_2$-(A)-H, T-C(S)O-(A)-H.

Disclosed are polymer compositions comprising polymer chains of formulas described above in combination with polymer chains of the formula above where g is greater than 0, for example the polymer chains may have a structure T[-CO$_2$-(A)-H]$_g$, T[-SO$_3$-(A)-H]$_g$ T[-S-(A)-H]$_g$. (where each S is a sulfur atom or T[-CS$_2$-(A)-H]$_g$, g may be 2, 3, 4, 5, or greater than 5. Disclosed are polymer compositions comprising polymer chains of the formula: —[Y'-(A)-R$^k$]$_{g+1}$, where each of T, Y', (A), R$^k$ and g is as defined above. The disclosed polymer compositions may comprise mixtures comprising polymer chains of formula disclosed above in combination with polymer chains of the formula where g is 0, for example T-CO$_2$-(A)-R$^k$, T-SO$_3$-(A)-R$^k$, T-S-(A)-R$^k$ (where S is a sulfur atom) T-CS$_2$-(A)-R$^k$ or T-C(S)O-(A)-R$^k$. Disclosed are polymer compositions comprising mixtures comprising polymer chains of formula disclosed above in combination with polymer chains of the formula where g is greater than 0, such as T[-CO$_2$-(A)-R$^k$]$_g$, In certain embodiments the polymer chains of such formula have a structure T[-SO$_3$-(A)-R$^k$]$_g$. T[-S-(A)-R$^k$]$_g$(where each S is a sulfur atom) or T[-CS$_2$-(A)-R$^k$]$_g$. g may be 1 2 3, 4, 5, or greater than 5. Where w is two or greater the polymers formed may be chain extended by compounds having two or more epoxide and or lactone groups. The chain extension and or crosslinking may be performed under conditions wherein epoxide and or lactone groups ring open as disclosed herein.

EXAMPLES

The following examples are merely illustrative and are not meant to limit any aspects of the present disclosure in any way. Exemplary strong bases which can form a salt with acetate carboxylates include the following.

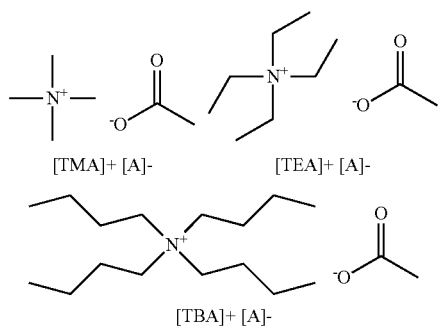

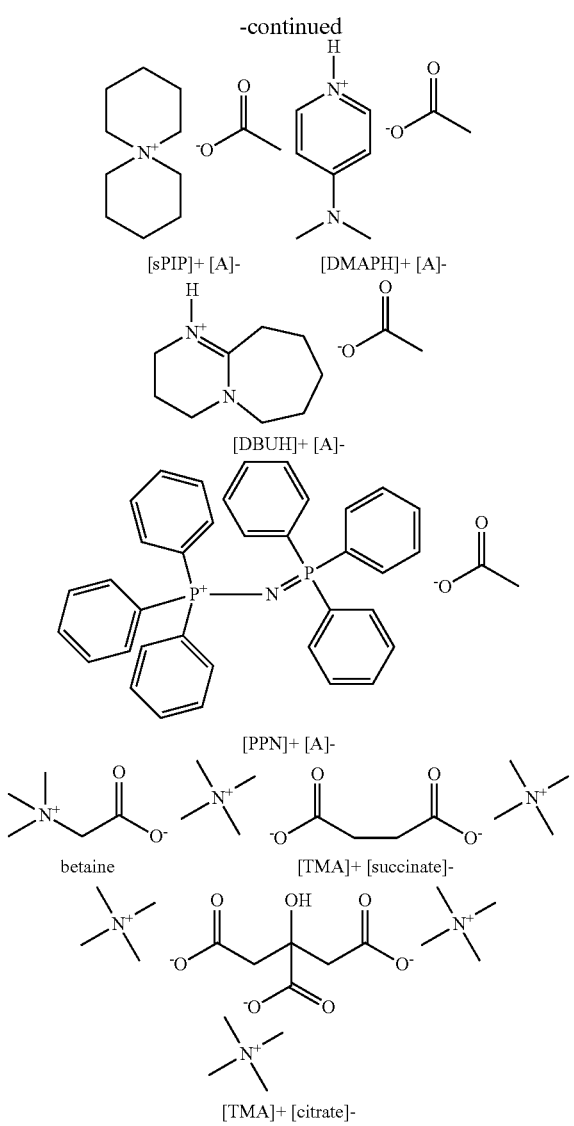

Beta-propiolactone is a highly reactive chemical and reactions are performed in solvent to mitigate any intense exotherms from the enthalpy of ring-opening of the monomer.

Example 1. When tetramethylammonium acetate (4.2 mg; 0.030 mmol), beta-propiolactone (1.15 g; 16 mmol), and THF solvent; 13 mL are combined in a glass vial, 100% of bPL is consumed in 6 h to yield a white polymer of P3HP precipitating from solution. Mn according to GPC is 25,400 g/mol; PDI is 2.1. The monomer to initiator ratio fed is 500:1.

Example 2. When tetramethylammonium acetate (2.1 mg; 0.015 mmol), beta-propiolactone (1.15 g; 16 mmol), and THF solvent; 13 mL are combined in a glass vial, 100% of bPL is consumed in 6 h to yield a white polymer of P3HP precipitating from solution. Mn according to GPC is 65,100 g/mol; PDI is 2.3. The monomer to initiator ratio fed is 1000:1.

Example 3. When tetramethylammonium acetate (1.1 mg; 0.008 mmol), beta-propiolactone (1.15 g; 16 mmol), and THF solvent; 13 mL are combined in a glass vial, 100% of bPL is consumed in 6 h to yield a white polymer of P3HP precipitating from solution. Mn according to GPC is 72,500 g/mol; PDI is 2.1. The monomer to initiator ratio fed is 2000:1.

The results of additional examples are shown in Table 1 where the solvent, initiator, initiator ratio and time of completion of the reaction are varied and reported in the Table. The initiators used are tetramethylammonium acetate ([TMA]+[A]−, 1,8-diazabicyclo(5.4.0)undec-7-enium acetate ([DBUH]+[A]−, tetrabutylammonium acetate ([TBA]+[A]−, bis-spiropiperidinum acetate ([sPIP]+[A]−, 4-(dimethylamino)-pyridinium acetate ([DMAPH]+[A]−, 1,8-diazabicyclo(5.4.0)undec-7-enium acetate ([DBUH]+[A]−, bis(tetramethylammonium succinate ([TMA]+[succinate]−, and tris(tetramethylammonium citrate ([TMA]+[citrate].

TABLE 1

Examples of polymer molar masses from variable initiators for beta-propiolactone polymerization.

| Initiator[a] | M:I[b] | Solvent | Time[c] [h] | $M_{n[theo]}$[d] (g/mol) | $M_{n[GPC]}$[e] (g/mol) | $M_{w[GPC]}$[e] (g/mol) | Đ[e] |
|---|---|---|---|---|---|---|---|
| [TMA]+ [A]− | 500:1 | THF | 6 | 36,000 | 25,400 | 53,300 | 2.1 |
| | 1000:1 | THF | 6 | 72,000 | 65,100 | 149,700 | 2.3 |
| | 2000:1 | THF | 6 | 144,000 | 72,500 | 152,300 | 2.1 |
| | 500:1 | MTBE | 6 | 36,000 | 74,000 | 169,000 | 2.3 |
| | 1000:1 | MTBE | 6 | 72,000 | 168,000 | 351,000 | 2.0 |
| | 2000:1 | MTBE | 6 | 144,000 | 304,000 | 518,000 | 1.7 |
| | 2000:1 | MTBE | 2 | 144,000 | 129,100 | 242,300 | 1.9 |
| | 2000:1 | CPME | 24 | 144,000 | 159,100 | 397,000 | 2.5 |
| | 1500:1 | EtOAC | 24 | 108,000 | 127,100 | 304,500 | 2.4 |
| [TEA]+ [A]− | 500:1 | THF | 6 | 36,000 | 33,800 | 65,500 | 1.9 |
| | 2000:1 | THF | 6 | 144,000 | 65,500 | 114,500 | 1.7 |
| [PPN]+ [A]− | 1000:1 | ether | 24 | 72,000 | 22,600 | 59,200 | 2.6 |
| | 1000:1 | THF | 1 | 72,000 | 63,000 | 69,000 | 1.1 |
| | 1000:1 | MTBE | 24 | 72,000 | 133,500 | 226,800 | 1.7 |
| | 1000:1 | mTHF | 24 | 72,000 | 17,000 | 51,500 | 3.0 |
| | 1000:1 | DIPE | 24 | 72,000 | 42,700 | 95,000 | 2.2 |

TABLE 1-continued

Examples of polymer molar masses from variable initiators for beta-propiolactone polymerization.

| Initiator[a] | M:I[b] | Solvent | Time[c] [h] | $M_{n[theo]}$[d] (g/mol) | $M_{n[GPC]}$[e] (g/mol) | $M_{w[GPC]}$[e] (g/mol) | Đ[e] |
|---|---|---|---|---|---|---|---|
| [sPIP]+ [A]– | 500:1 | THF | 6 | 36,000 | 10,200 | 16,300 | 1.6 |
| [TBA]+ [A]– | 200:1 | THF | 24 | 14,400 | 1,600 | 7,800 | 4.9 |
| [DMAPH]+ [A]– | 1000:1 | THF | 12 | 72,000 | 25,700 | 110,500 | 4.3 |
| | 2000:1 | THF | 24 | 144,000 | 97,800 | 195,600 | 2.0 |
| [DBUH]+ [A]– | 1000:1 | THF | 6 | 36,000 | 57,700 | 196,200 | 3.4 |
| DBU | 1000:1 | THF | 12 | 72,000 | 19,000 | 60,800 | 3.2 |
| | 1000:1 | MTBE | 15 | 72,000 | 36,000 | 540,000 | 15.0 |
| [TMA]+ [citrate]– | 2000:1 | THF | 6 | 144,000 | 137,700 | 294,600 | 2.1 |
| | 6000:1 | THF | 6 | 432,000 | 166,200 | 393,400 | 2.4 |
| | 6000:1 | MTBE | 2 | 432,000 | 98,200 | 294,600 | 3.0 |
| [TMA]+ [succinate]– | 2000:1 | THF | 6 | 144,000 | 121,600 | 250,300 | 2.1 |
| | 4000:1 | THF | 6 | 288,000 | 154,000 | 306,200 | 2.0 |
| | 4000:1 | MTBE | 24 | 288,000 | 210,100 | 462,200 | 2.2 |

Figure 2:
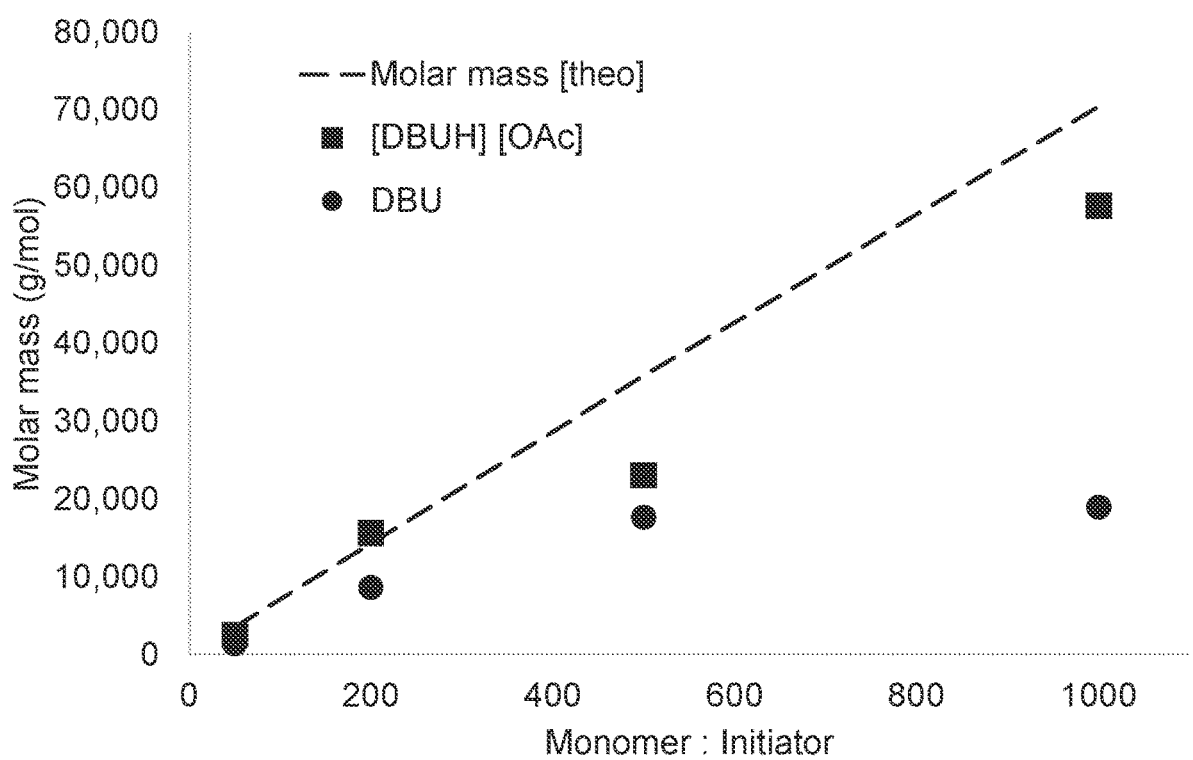
FIG. 2 illustrates that acetate salts mitigate side reactions to a degree.
Figure 3:
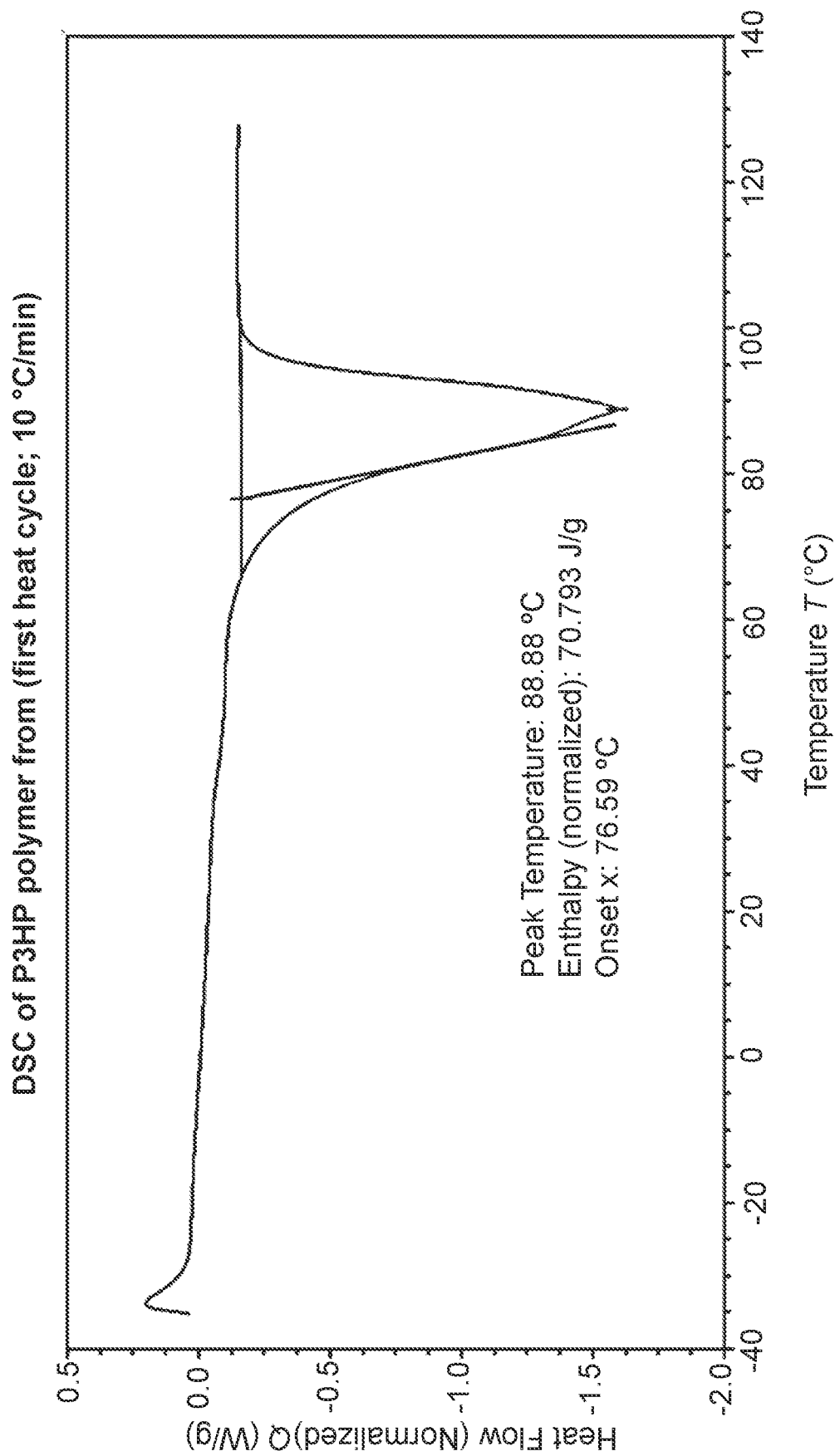
FIG. 3 shows the melting point ranges for one polymorph are from 75-80° C.

[a] Initiator examples [Refer to FIGS. 2 and 3 for abbreviations]
[b] Monomer [M] to initiator [I] ratio
[c] Time to reach greater than 99% conversion of the bPL in 1.1-1.8 M bPL in THF solvent.
[d] Theoretical molar mass [assuming 100% monomer conversion]
[e] Number-average molar mass ($M_n$), weighted average molar mass ($M_w$), and dispersity (Đ = $M_w/M_n$) determined by CHCl$_3$-GPC (40° C.; 1.0 mL/min) versus PMMA standards.

FIG. 1 shows Molar mass as a function of monomer to initiator ratio. As shown, the tetramethylammonium acetate salt shows greater control over the molar mass compared to longer alkyl, of bulkier alkyl groups. FIG. 2 shows Molar mass as a function of monomer to initiator ratio. As shown, the acetate salt, 1,8-diazabicyclo(5.4.0)undec-7-enium acetate ([DBUH]+[A]–) shows greater control over the molar mass compared to the pure DBU initiator. Acetate salts from strong bases and acetic acid, such as [DBUH]+[A]–, provide good control of the polymerization. The molar mass increases with monomer to initiator ratio, as expected for the theoretical mass, see FIG. 1. However, at full conversion, this trend does not always hold up, causing a reduction of the expected molar mass. Acetate salts mitigate side reactions to a degree FIG. 2. The alkyl groups on the ammonium salts also prove to be important FIG. 1. Tetramethylammonium acetate shows full beta-lactone conversion in less than 6 h, with good control over the polymer molar mass. Longer alkyl chains on the ammonium counterion, of a bulkier piperidinium group hinders monomer conversion as well FIG. 1. Multi-arm initiators using succinate and citrate carboxylates in combination with tetramethylammonium cations (FIG. 3), can be used to generate high molar mass polymers in a reduced amount of time. Furthermore, these tri- and bi-functionalized can be used for thermoset applications, compatible with epoxy-crosslinking chemistries.

Thermal Conclusions

Figure 4:
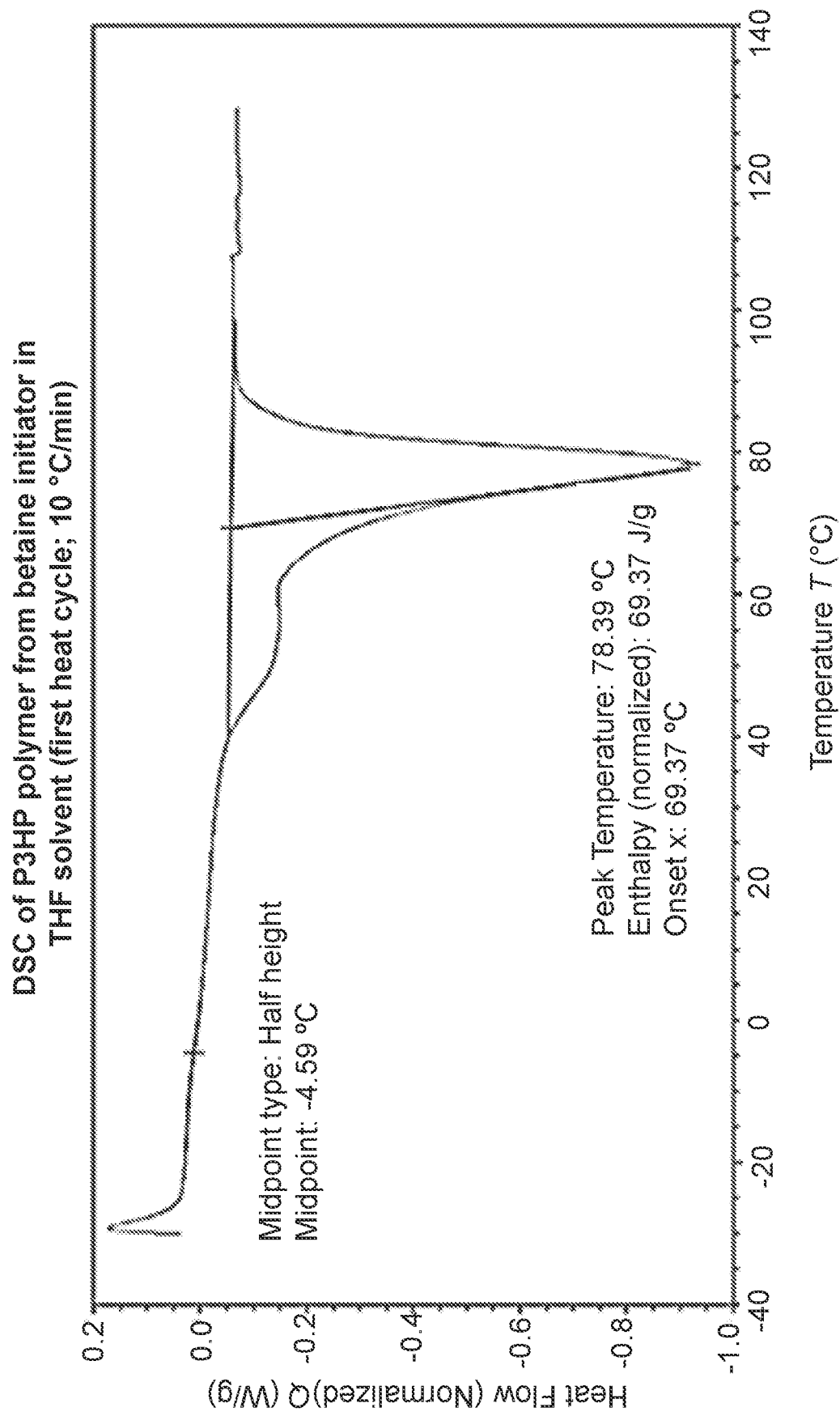
FIG. 4 shows the melting point ranges for one polymorph are from 89-95° C.
Figure 5:
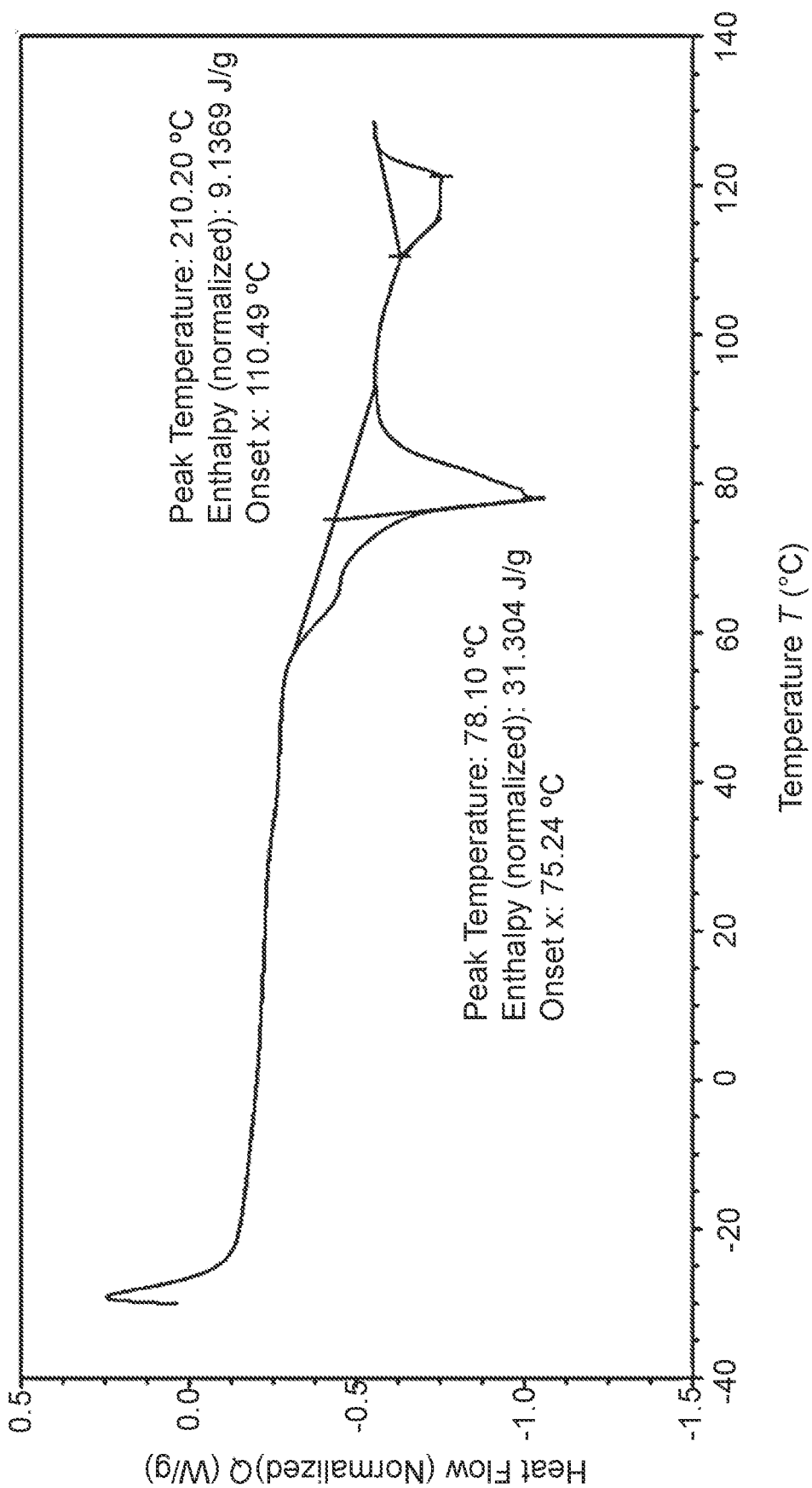
FIG. 5 shows the melting point ranges for one polymorph are from 110-125° C.

Poly(beta-3-hydroxypropanoates) (P3HP) exhibits polymorphism that results in at least three distinct polymer melting points. The melting point ranges for each polymorph are from 75-80° C. (FIG. 3), 89-95° C. (FIG. 4), and 110-125° C. (FIG. 5). The formation of the polymorphs is largely dependent on the polymerization reaction conditions which alter the polymer molar mass and the polymer dispersity.

The thermal properties of P3HP from various reaction conditions are shown in Table 2. In general, zwitterionic initiators, such as betaine, and strong bases, such as DBU, result in polymers with the lowest crystalline behavior (low Tm). This is likely due to the broad polymer dispersity of these samples (>2.5; Table 1). The 90° C. melting point polymorph is only observed when [PPN]+[A]– is used as an initiator. And the highest melting point polymorph (110-125° C.) is observed when non-polar solvents are used, such as MTBE and ether.

This higher melting point material from P3HP is an important advancement in expanding the potential applications in P3HP-based thermoplastics. These higher melting-point polymers can be used as "seed" materials for bulk P3HP to introduce this behavior in polymer films and injection-molded materials.

TABLE 2

Thermal properties of polymers

| Initiator | Polymerization Solvent | $M_w$[a] | Đ[b] | $T_{m1}$[c] (° C.) | ΔH$_1$[c] (J/g) | $T_{m2}$[d] (° C.) | ΔH$_2$[d] (J/g) | $T_g$[e] (° C.) |
|---|---|---|---|---|---|---|---|---|
| Betaine | THF | 147,800 | 3.5 | 79 | 64 | 79 | 50 | –20 |
| | MTBE | 275,200 | 2.9 | 81 | 37 | 80 | 47 | NA |
| | ether | 310,000 | 3.0 | 83 | 69 | 79 | 38 | –13 |
| | DIPE | 347,800 | 3.0 | 78 | 58 | 79 | 51 | –17 |
| PPN Ac | THF | 45,000 | 1.1 | 89 | 75 | 79 | 55 | –18 |
| | MTBE | 226,800 | 1.7 | 80121 | 582 | 80 | 53 | –15 |
| | ether | 59,200 | 2.6 | 79115 | 259 | 79 | 50 | –18 |
| | DIPE | 95,000 | 2.2 | 78111 | 387 | 78 | 56 | NA |
| TMAA | THF | 203,000 | 2.6 | 77 | 58 | 79 | 56 | –17 |
| | MTBE | 370,000 | 2.0 | 80122 | 385 | 78 | 55 | –18 |
| | CPME | 397,000 | 2.5 | 80115 | 276 | 78 | 50 | –19 |
| | mTHF | 268,000 | 2.6 | 79111 | 448 | 79 | 57 | –21 |

TABLE 2-continued

| | | | | | $T_{m1}{}^c$ | $\square H_1{}^c$ | $T_{m2}{}^d$ | $DH_2{}^d$ | $T_g{}^e$ |
|---|---|---|---|---|---|---|---|---|---|
| Initiator | Polymerization Solvent | | $M_w{}^a$ | $Đ^b$ | (° C.) | (J/g) | (° C.) | (J/g) | (° C.) |
| DBU | THF | | 222,000 | 3.3 | 79 | 58 | 79 | 55 | −20 |
| | MTBE | | 371,000 | 6.7 | 80 | 61 | 78 | 56 | −18 |

$^a$Weighted average molar mass ($M_w$ determined by GPC; ° C. CHCl$_3$ at 1 mL/min)
$^b$Polymer dispersity ($M_w/M_n$)
$^c$Polymer melting point ($T_{m1}$) on the first heating cycle (10° C./min)
$^d$Polymer melting point ($T_{m1}$) on the second heating cycle (10° C./min)
$^e$Thermal glass transition ($T_g$)
f. FIGS. 3 to 5 show DSC scans of polymers prepared.

Methods:

GPO was performed on an Agilent 1260 Infinity 11 HPLC system equipped with two PLgel 300×7.5 mm (PL111-6500) size exclusion columns and a multi-detector [refractive index and viscometer]. The GPO was performed in chloroform solvent at a rate of 1.0 mL/min and maintained at 40° C. Polymer molar masses were determined using a conventional calibration curve of the RI signal generated with monodisperse PMMA polymer standards. PMMA standards range from 500 g/mol to 2,000,000 g/mol (Agilent EasiVial; Part No: PL2020-0201). The P3HP polymer was dissolved in HPLC grade chloroform [2 mg/mL], then filtered through 0.2 mm PVDF filter. 1H NMR spectroscopy was performed of a 400 MHz Varian INOVA spectrometer. The spectrum is referenced to protio-chlorofom (7.26 ppm: The PH3P sample was dissolved in 00013 (99.8% deuterated; Cambridge Isotope) at a 10 mg/mL concentration. TGA was performed on a TA instrument Q50-series thermogravimetric analyzer under N2(g) at a ramp rate of 10° C.×min-1). DSC was performed on a TA instrument Q20-series differential scanning calorimeter under N2(g) at a ramp rate of 10° C.×min-1. The thermal history of the polymer is as follows: the polymer was melted at 130° C. to erase thermal and solvent memory and cooled to −30° C. at a rate of 10° C.×min-1. The sample was heated again at a ramp rate of 10° C.×min-1 to 130° C., then rapidly cooled to −30° C. [melt-quenching]. The polymer was then re-heated to 130° C. [ramp rate of 10° C.×min-1].

Other Embodiments

1. A polymer comprising one or more polymer chains having ring opened beta propiolactone and/or substituted betapropiolactone units and having on one end of the chains a residue of a carboxylate anion covalently bonded to the one end of the polymer chains.

2. A polymer according to Embodiment 1 wherein the one or more polymer chains have the residue of an end capping agent or quenching agent on one of the other end of the chains.

3. A polymer according to Embodiment 2 wherein the end capping agent is an organohalide, organosulfonate, a haloalkyl silane, an aniline derivative, a phosphate derivative, and an isophthalic acid derivative.

4. A polymer according to any of the preceding Embodiments wherein the polymer comprises chains according to one of the formulas:

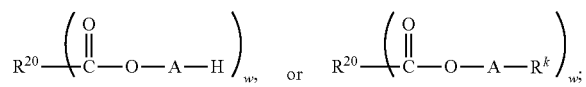

wherein: A is separately in each occurrence a polymer chain having ring opened beta propiolactone and/or substituted betapropiolactone units;
R$^{20}$ is separately in each occurrence a hydrocarbyl group which is optionally substituted;
R$^k$ is separately in each occurrence the residue of an endcapping agent or a quenching agent; and
w is separately in each occurrence a number of f 1 or greater.

5. A polymer according to Embodiment 4 wherein:
A is separately in each occurrence polymer chain comprising units derived from 3-hydroxypropionate and/or substituted 3-hydroxypropionate;
R$^{20}$ is separately in each occurrence an alkyl group;
R$^k$ is separately in each occurrence the residue of an end capping agent comprising an organohalide, organosulfonate, a haloalkyl silane, an aniline derivative, a phosphate derivative, a boric derivative or an isophthalic acid derivative;
w is separately in each occurrence a number of from 1 to 6.

6. A polymer according to Embodiment 4 wherein the polymer comprises chains according to one of the formulas

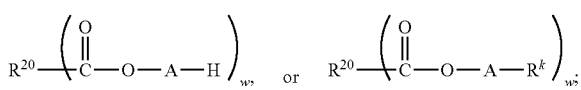

wherein A is separately in each occurrence a polymer chain having ring opened beta propiolactone and/or substituted betapropiolactone units;
R$^{20}$ is separately in each occurrence a hydrocarbyl group which is optionally substituted;
R$^k$ is separately in each occurrence the residue of an endcapping agent or a quenching agent; and,
w is separately in each occurrence a number of from 1 to 6.

7. A polymer according to any one of the preceding Embodiments wherein R$^{20}$ is an alkyl group.

8. A polymer according to any one of the preceding Embodiments wherein the polymer contains a comonomer which polymerizes with ring opened beta propiolactone and/or substituted betapropiolactone.

9. A polymer according to any one of the preceding Embodiments wherein the comonomers are one or more of caprolactones, lactides, epoxides, oxetanes, cyclic anhydrides, cyclic ethers, lactams, episulfides, aziridines, (meth)acrylates, valerolactones, butyrolactone, glycolides and substituted glycolides.

10. A polymer composition according to any one of the preceding Embodiments wherein the comonomers are one or more epoxides.

11. A polymer according to any one of the preceding Embodiments wherein the polymer has a weight average molecular weight determined by gel permeation chromatography using monodisperse polymethyl methacrylate standards of 25,000 g/mol or greater and a polydispersity of 3.0 or less calculated from gel permeation chromatography data.

12. A polymer according to any one of the preceding Embodiments wherein the polymer has a weight average molecular weight of 50,000 g/mol or greater determined by gel permeation chromatography using monodisperse polymethyl methacrylate standards and a polydispersity of 2.5 or less calculated from gel permeation chromatography data.

13. A polymer according to any one of the preceding Embodiments wherein the polymer has a weight average molecular weight of 100,000 g/mol or greater determined by gel permeation chromatography using monodisperse polymethyl methacrylate standards and a polydispersity of 3.0 or less calculated from gel permeation chromatography data.

14. A polymer according to any one of the preceding Embodiments wherein the polymer has a weight average molecular weight of 200,000 g/mol or greater determined by gel permeation chromatography using monodisperse polymethyl methacrylate standards and a polydispersity of 2.5 or less calculated from gel permeation chromatography data.

15. A polymer according to any one of the preceding Embodiments wherein the polymer is polymorphic.

16. A polymer according to any one of the preceding Embodiments wherein the polymer is polymorphic having DSC peaks at from 73 to 83° C. and from 110 to 125° C.

17. A polymer according to any one of the preceding Embodiments wherein the polymer is polymorphic having DSC peaks at from 73 to 83° C., from 89 to 95° C. and from 110 to 125° C.

18. A polymer according to anyone of the preceding Embodiments wherein the polymer comprises chains according to one of the formulas

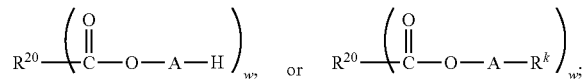

wherein A is separately in each occurrence a polymer chain having ring opened beta propiolactone and/or substituted betapropiolactone units;

$R^{20}$ is separately in each occurrence a hydrocarbyl group which is optionally substituted;

$R^k$ is separately in each occurrence the residue of an endcapping agent or a quenching agent; and, w is separately in each occurrence a number of 2 or greater;

wherein polymers are crosslinked by one or more polyepoxides or polylactones.

19. A polymer according to Embodiment 18 wherein w is from 2 to 6.

20. A polymer according to Embodiment 18 wherein w is 2 and/or 3.

21. A polymer according to Embodiment 18 or 19 wherein $R^{20}$ is an alkyl group.

22. A polymer according to any one of Embodiments 18 to 21 wherein $R^{20}$ is a straight chain alkyl group.

23. A polymerizable composition comprising:
a. one or more of beta propiolactone and/or substituted betapropiolactones; and,
b. one or more carboxylate salts of an onium cation.

24. A polymerizable composition according to Embodiment 23 comprising one or more comonomers which copolymerize with the one or more of beta propiolactone and/or substituted betapropiolactones.

25. A polymerizable composition according to Embodiment 23 or 24 comprising one or more of chain transfer agents, chain extenders, quenching agents and end capping agents.

26. A polymerizable composition according to any one of Embodiments 23 to 25 wherein the ratio of the one or more of beta propiolactone and/or substituted betapropiolactones to the one or more carboxylate salts of an onium cation is from about 100 to 1 to about 1,000,000 to 1.

27. A polymerizable composition according to any one of Embodiments 23 to 26 wherein the end capping agent is an organohalide, organosulfonate, a haloalkyl silane, an aniline derivative, a phosphate derivative, a boric derivative, and an isophthalic acid derivative.

28. A polymerizable composition according to any one of Embodiments 23 to 27 wherein the end-capping or quenching agent is present in an amount of less than 10 molar equivalents relative to the amount of carboxylate salt of an onium cation.

29. A polymerizable composition according to any one of Embodiments 23 to 28 wherein comonomers are one or more of caprolactones, lactides, epoxides, oxetanes, cyclic anhydrides, cyclic ethers, lactams, episulfides, aziridines, (meth)acrylates, valerolactones, butyrolactone, glycolides and substituted glycolides.

30. A polymerizable composition according to any one of Embodiments 23 to 29 wherein comonomers are one or more epoxides.

31. A polymerizable composition according to any of the preceding Embodiments 23 to 30 wherein the onium cations contain nitrogen, phosphorus, sulfur, antimony or arsenic.

32. A method comprising contacting one or more of beta propiolactone, substituted betapropiolactones and comonomers with one or more carboxylate salts of an onium cation under conditions to prepare one or more polymers comprising one or more polymer chains having ring opened beta propiolactone and/or substituted betapropiolactone units and having on one end of the chains a residue of carboxylate salt of an onium cation covalently bonded to the one end of the polymer chains.

33. A method according to Embodiment 32 wherein the ratio of the one or more of beta propiolactone and/or substituted betapropiolactones and comonomers to the one or more carboxylate salt of an onium cation is from about 100 to 1 to about 1000,000 to 1.

34. A method according to Embodiment 32 or 33 wherein the one or more of beta propiolactone and/or substituted betapropiolactones and comonomers and one or more carboxylate salts of an onium cation are contacted at a temperature of from about 30° C. to about 120° C.

35. A method according to any one of Embodiments 32 to 34 wherein the one or more of beta propiolactone and/or substituted betapropiolactones and comonomers and one or more carboxylate salts of an onium cation are contacted at a pressure of between about 1 bar and about 20 bar.

36. A method according to any one of Embodiments 32 to 35 wherein the one or more of beta propiolactone and/or substituted betapropiolactones and comonomers and carboxylate salt of an onium cation are contacted for a time sufficient to consume substantially all of the one or more of beta propiolactone and/or substituted betapropiolactones and comonomers.

37. A method according to any one of Embodiments 32 to 36 wherein after a specified reaction time, or when the polymer composition has reached a desired molecular weight, a quenching agent is added to terminate the polymerization reaction.

38. A method according to any one of Embodiments 32 to 37 wherein the quenching agent is one or more of mineral acids, organic acids or acidic resins or solids.

39. A method according to any one of Embodiments 32 to 38 wherein after a specified reaction time, or when the polymer composition has reached a desired molecular weight an endcapping agent is added.

40. A method according to Embodiment 39 wherein the end capping agents comprises one or more electrophilic organic compounds.

41. A method according to Embodiment 40 wherein the end capping agents comprise one or more one or more of an organohalide, organosulfonate, a haloalkyl silane, an aniline derivative, a phosphate derivative, a boric derivative, and an isophthalic acid derivative.

42. A method according to any one of Embodiments 32 to 41 wherein the end-capping agent is present in an amount of less than 10 molar equivalents relative to the amount of the carboxylate salt of an onium cation.

43. A method according to any one of Embodiments 32 to 42 wherein the solvent is a non-polar solvent.

44. A method according to any one of Embodiments 32 to 42 wherein the solvent is a non-polar ether.

45. A method according to any one of Embodiments 32 to 44 wherein the solvent exhibits a polarity of less than 0.2.

46. A method according to anyone of Embodiments 32 to 45 wherein the solvent is a non-cyclic ether.

47. A method according to any one of Embodiment 32 to 45 wherein the solvent is methyl tert-butyl ether, dimethyl ether, diethyl ether, cyclopentyl methyl ether, ethyl acetate and diisopropyl ether.

48. A method according to any one of Embodiment 32 to 47 wherein the initiator is an ammonium acetate, ammonium succinate, ammonium citrate, pyridinium acetate, or phosphineiminium acetate.

49. A method according to any one of Embodiment 32 to 48 wherein the initiator is tetramethyl ammonium acetate, tetraethyl ammonium acetate, tetrabutylammonium acetate, bis-spiropiperidinum acetate, 4-(dimethylamino)-pyridinium acetate, 1,8-diazabicyclo(5.4.0)undec-7-enium acetate, bis(tetramethylammonium) succinate, tris(tetramethylammonium) citrate or bis(triphenylphosphine)iminium acetate.

50. A method according to any one of Embodiment 32 to 49 wherein the polymer has a weight average molecular weight of 25,000 g/mol or greater determined by gel permeation chromatography using monodisperse polymethyl methacrylate standards and a polydispersity of 3.0 or less calculated from gel permeation chromatography data.

51. A method according to any one of Embodiments 32 to 50 wherein the polymer has a weight average molecular weight of 50,000 g/mol or greater determined by gel permeation chromatography using monodisperse polymethyl methacrylate standards and a polydispersity of 2.5 or less calculated from gel permeation chromatography data.

52. A method according to any one of Embodiments 32 to 4550 wherein the polymer has a weight average molecular weight of 100,000 g/mol or greater determined by gel permeation chromatography using monodisperse polymethyl methacrylate standards and a polydispersity of 3.0 or less calculated from gel permeation chromatography data.

53. A method according to any one of Embodiments 32 to 50 wherein the polymer has a weight average molecular weight of 200,000 g/mol or greater determined by gel permeation chromatography using monodisperse polymethyl methacrylate standards and a polydispersity of 2.5 or less calculated from gel permeation chromatography data.

54. A method according to any one of Embodiments 32 to 53 wherein the polymer is polymorphic.

55. A method according to any one of Embodiments 32 to 53 wherein the polymer is polymorphic having DSC peaks at from 73 to 83° C. and from 110 to 125° C.

56. A method according to any one of Embodiments 32 to 53 wherein the polymer is polymorphic having DSC peaks at from 75 to 80° C., from 89 to 95° C. and from 110 to 125° C.

57. A method according to any one of Embodiments 32 to 56 wherein the polymer formed is contacted with a polyepoxide or a polylactone to under conditions such that the polymer is crosslinked through the terminal groups of the polymer.

The foregoing has been a description of certain non-limiting embodiments of the invention. Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

We claim:

1. A polymer comprising one or more polymer chains having ring opened beta propiolactone and/or substituted betapropiolactone units and having on one end of the chains a residue of a carboxylate anion covalently bonded to the one end of the polymer chains;

wherein the polymer comprises chains according to the formula:

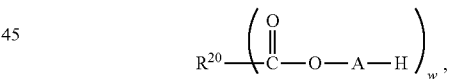

wherein: A is separately in each occurrence a polymer chain having ring opened beta propiolactone and/or substituted betapropiolactone units;

$R^{20}$ is separately in each occurrence a hydrocarbyl group which is optionally substituted; and w is separately in each occurrence a number of 1 or greater:

wherein the polymer exhibits one or more of the polymer is polymorphic having DSC peaks at from 73 to 83° C. and from 110 to 125° C. or the polymers are crosslinked by one or more polyepoxides or polylactones.

2. The polymer according to claim 1, wherein the polymer contains a comonomer which polymerizes with ring opened beta propiolactone and/or substituted betapropiolactone.

3. The polymer according claim 2, wherein the comonomers are one or more of caprolactones, lactides, epoxides, oxetanes, cyclic anhydrides, cyclic ethers, lactams, episulfides, aziridines, (meth)acrylates, valerolactones, butyrolactone, glycolides and substituted glycolides.

4. The polymer according to claim 1 wherein the polymer has polydispersity of 2.5 or less calculated from gel permeation chromatography data.

5. The polymer according to claim 1, wherein the polymer exhibits a polydispersity of 3.5 or less.

6. A polymer according to claim 1, wherein the polymer is polymorphic having DSC peaks at from 73 to 83° C., from 89 to 95° C. and from 110 to 125° C.

7. A polymer comprising one or more polymer chains having ring opened beta propiolactone and/or substituted betapropiolactone units and having on one end of the chains a residue of a carboxylate anion covalently bonded to the one end of the polymer chains; wherein the polymer comprises chains according to the formula:

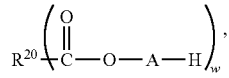

wherein A is separately in each occurrence a polymer chain having ring opened beta propiolactone and/or substituted betapropiolactone units, w is 2 and $R^{20}$ is a propyl group having a hydroxyl group on the middle carbon, 2 carbon.

8. A polymer comprising one or more polymer chains having ring opened beta propiolactone and/or substituted betapropiolactone units and having on one end of the chains a residue of a carboxylate anion covalently bonded to the one end of the polymer chains; wherein the polymer comprises chains according to the formula:

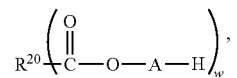

wherein A is separately in each occurrence a polymer chain having ring opened beta propiolactone and/or substituted betapropiolactone units; w is 3 and $R^{20}$ is an ethyl group.

9. A polymer according to claim 7, wherein the polymer is polymorphic having DSC peaks at from 73 to 83° C. and from 110 to 125° C. or the polymers are crosslinked by one or more polyepoxides or polylactones.

10. A polymer according to claim 8, wherein the polymer is polymorphic having DSC peaks at from 73 to 83° C. and from 110 to 125° C. or the polymers are crosslinked by one or more polyepoxides or polylactones.

* * * * *